US012645860B2

(12) United States Patent
Zhao et al.

(10) Patent No.: US 12,645,860 B2
(45) Date of Patent: Jun. 2, 2026

(54) DISPLAY SYSTEM, METHOD FOR PROCESSING TRAJECTORY POINT SEQUENCE, STORAGE MEDIUM AND DEVICE

(71) Applicant: BOE TECHNOLOGY GROUP CO., LTD., Beijing (CN)

(72) Inventors: Lifei Zhao, Beijing (CN); Tieli Chen, Beijing (CN); Jiahui Bian, Beijing (CN); Pengyu Liu, Beijing (CN); Fengshuo Hu, Beijing (CN); Guangwei Huang, Beijing (CN); Zhanfu An, Beijing (CN); Yuhan Qin, Beijing (CN); Chao Nie, Beijing (CN); Cheng Ma, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 273 days.

(21) Appl. No.: 18/690,543

(22) PCT Filed: Feb. 28, 2022

(86) PCT No.: PCT/CN2022/078294

§ 371 (c)(1),
(2) Date: Mar. 8, 2024

(87) PCT Pub. No.: WO2023/159569

PCT Pub. Date: Aug. 31, 2023

(65) Prior Publication Data

US 2025/0131179 A1     Apr. 24, 2025

(51) Int. Cl.
    *G06F 40/103*        (2020.01)
    *G06F 3/04842*       (2022.01)
    *G06F 3/0488*        (2022.01)

(52) U.S. Cl.
    CPC ........ *G06F 40/103* (2020.01); *G06F 3/04842* (2013.01); *G06F 3/0488* (2013.01)

(58) Field of Classification Search
    CPC .................................................... G06F 40/103
    (Continued)

(56) References Cited

U.S. PATENT DOCUMENTS 8,364,623 B1 *  1/2013  Bunker .................. G06F 16/26
                                                  707/794
11,853,356 B1 *  12/2023  Krishnaswamy ..... G06F 40/279
                    (Continued)

FOREIGN PATENT DOCUMENTS

CN          106020685 A        10/2016
CN          106294664 A        1/2017
                    (Continued)

OTHER PUBLICATIONS

International Search Report of PCT/CN2022/078294 dated Oct. 10, 2022 with English translation, (4p).
                    (Continued)

*Primary Examiner* — Reza Nabi
(74) *Attorney, Agent, or Firm* — Arch & Lake LLP

(57)            ABSTRACT

A display system, a method for processing a trajectory point sequence, a storage medium, and a device are provided. The display system includes a display, a processor, and an input component. The processor is configured to control the display to display an interaction interface; receive a trajectory point sequence input by a user by means of the input component; generate a first content based on the trajectory point sequence and control the display to display the first content; recognize a first identification sequence included in the trajectory point sequence, to determine a first feature identifier corresponding to the first content; determine a cluster relationship of the first content according to the first
                    (Continued)

100

Display System

Display ⟷ Processor 110    120 feature identifier; generate a display region in a preset format according to the cluster relationship; and control the display to display the display region on the interaction interface.

20 Claims, 9 Drawing Sheets

(58) Field of Classification Search
USPC ......................................................... 715/243
See application file for complete search history.

(56) References Cited

U.S. PATENT DOCUMENTS

| | | | | |
|---|---|---|---|---|
| 12,099,479 B1* | 9/2024 | Wu | .......................... | G06F 16/21 |
| 2004/0190838 A1* | 9/2004 | Bush | ................... | G02B 6/2555 |
| | | | | 385/96 |
| 2009/0119584 A1* | 5/2009 | Herbst | .................... | G06F 16/36 |
| | | | | 715/825 |
| 2011/0282873 A1* | 11/2011 | Mirus | ................... | G06F 16/284 |
| | | | | 715/764 |
| 2012/0036210 A1* | 2/2012 | Balajee | ................. | G06Q 10/06 |
| | | | | 709/206 |
| 2014/0096089 A1* | 4/2014 | Kim | ................... | G06Q 10/0631 |
| | | | | 715/853 |
| 2014/0297693 A1* | 10/2014 | Piecko | ................. | G06F 16/213 |
| | | | | 707/803 |
| 2015/0120836 A1* | 4/2015 | Koo | ........................ | H04L 67/10 |
| | | | | 709/204 |
| 2015/0134573 A1* | 5/2015 | Donatelli | ................. | G06N 5/02 |
| | | | | 706/55 |

| | | | | |
|---|---|---|---|---|
| 2015/0205266 A1* | 7/2015 | Chung | ................. | G04B 47/003 |
| | | | | 368/29 |
| 2016/0210268 A1* | 7/2016 | Sales | ................... | G06F 3/04842 |
| 2017/0139685 A1* | 5/2017 | Fu | ............................ | G06F 8/35 |
| 2017/0235550 A1* | 8/2017 | Fu | ............................ | G06F 8/34 |
| | | | | 717/104 |
| 2020/0012722 A1* | 1/2020 | Geng | ................... | G06V 30/414 |
| 2021/0297427 A1* | 9/2021 | Narula | ................... | G06F 3/048 |
| 2023/0033036 A1* | 2/2023 | Han | ................... | G06F 16/7867 |
| 2025/0068258 A1* | 2/2025 | Sedouram | ............ | G06F 3/0236 |
| 2025/0131179 A1* | 4/2025 | Zhao | ....................... | G06F 3/048 |
| 2025/0232178 A1* | 7/2025 | Jayaseelan | .............. | G06N 3/08 |

FOREIGN PATENT DOCUMENTS

| | | | | | |
|---|---|---|---|---|---|
| CN | 106294664 B | * | 4/2018 | ............. | G06F 16/00 |
| CN | 108304763 A | | 7/2018 | | |
| CN | 108647305 A | | 10/2018 | | |
| CN | 106020685 B | * | 5/2019 | .......... | G06F 3/0488 |
| CN | 111383298 A | | 7/2020 | | |
| CN | 111460782 A | | 7/2020 | | |
| CN | 111524206 A | | 8/2020 | | |
| CN | 111985189 A | | 11/2020 | | |
| CN | 112835504 A | | 5/2021 | | |
| CN | 113449734 A | | 9/2021 | | |

OTHER PUBLICATIONS

Written Opinion of the International Searching Authority of PCT/CN2022/078294 Dated Oct. 10, 2022, with English Translation, (5p).

\* cited by examiner

100

Display System

Display ⟷ Processor 110 120

Weather Forecast

Title of the mind map

Theme 1 of the mind map

Theme 1, sub theme 1 of the mind map

Theme 1, sub theme 2 of the mind map

Theme 2 of the mind map

Theme 2, sub theme 1 of the mind map

Theme 2, sub theme 2 of the mind map

1. Theme 1 of the mind map 1.1 Theme 1, sub theme 1 of the mind map 1.2. Theme 1, sub theme 2 of the mind map 2. Theme 2 of the mind map 2.1 Theme 2, sub theme 1 of the mind map

DISPLAY SYSTEM, METHOD FOR PROCESSING TRAJECTORY POINT SEQUENCE, STORAGE MEDIUM AND DEVICE

CROSS REFERENCE TO RELATED APPLICATION

The present disclosure is the U.S. national phase application of International Application No. PCT/CN2022/078294 filed on Feb. 28, 2022, the content of which is incorporated herein by reference in its entirety for all purposes.

TECHNICAL FIELD

The present disclosure relates to the field of human-computer interaction technology, in particular to a display system, a method for processing a trajectory point sequence, a computer-readable storage medium, and an electronic device.

BACKGROUND

With the development of computer technology, people are increasingly inclined to use a mind map to assist thinking in their daily work and lives. The mind map is a thinking diagram that uses visual classification and construction of different themes through keywords. The mind map can represent various levels of themes in a hierarchical diagram by using relationships such as mutual subordinate relationship or juxtaposition, making it clear and unambiguous.

SUMMARY

According to one aspect of the present disclosure, a display system is provided, including a display, a processor, and an input component.

The processor is configured to control the display to display an interaction interface.

The processor is further configured to receive a trajectory point sequence inputted by a user through the input component.

The processor is further configured to generate a first content in response to an input from the user and control the display to display the first content.

The trajectory point sequence includes a first identification sequence, and the processor is configured to recognize the first identification sequence inputted by the user for the first content, determine a first feature identifier corresponding to the first content, and determine a cluster relationship of the first content based on the first feature identifier.

The processor is further configured to generate a display region in a preset format based on the cluster relationship, and control the display to display the display region on the interaction interface, wherein the display region includes a standardized text corresponding to the first content and the cluster relationship.

According to one aspect of the present disclosure, a method for processing a trajectory point sequence is provided, which is configured in a display system. The display system displays an interaction interface on a display thereof, and the method for processing the trajectory point sequence includes: receiving a trajectory point sequence inputted by a user, generating a first content in response to an input from the user, and displaying the first content, wherein the trajectory point sequence includes a first identification sequence; recognizing the first identification sequence inputted by the user for the first content, determining a first feature identifier corresponding to the first content, and determining a cluster relationship of the first content based on the first feature identifier; and generating a display region in a preset format based on the cluster relationship, and displaying the display region on the interaction interface, wherein the display region includes a standardized text corresponding to the first content and the cluster relationship.

According to one aspect of the present disclosure, a computer-readable storage medium is provided, on which a computer program is stored, and when the computer program is executed by a processor, the methods for processing the trajectory point sequence described in any of above aspects are caused to be implemented.

According to one aspect of the present disclosure, an electronic device is provided, including: a processor; and a memory for storing instructions executable by the processor; and the processor is configured to implement the method for processing the trajectory point sequence described above by executing the instructions.

It should be understood that the general description above and the detailed description in the following are only illustrative and explanatory, and do not limit the present disclosure.

BRIEF DESCRIPTION OF THE DRAWINGS

The drawings, which are incorporated in and constitute a part of this specification, illustrate embodiments consistent with the present disclosure and serve together with the specification to explain principles of the present disclosure. It is apparent that the drawings in the following description are only some embodiments of the present disclosure, and for those of ordinary skill in the art, other drawings can also be obtained from these drawings without creative efforts, in which.

DETAILED DESCRIPTION

Figures 1, 2:
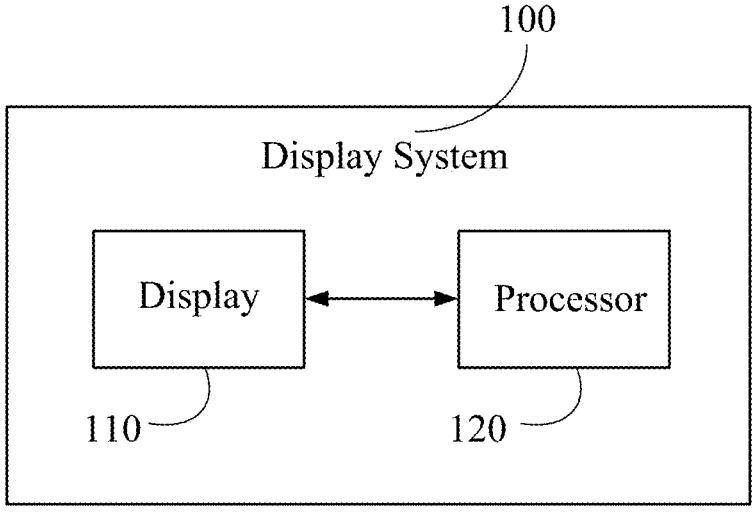
FIG. 1 schematically illustrates an example diagram of a structure of a display system according to embodiments of the present disclosure.
FIG. 2 schematically illustrates an example diagram of a first content according to embodiments of the present disclosure.

Example embodiments will now be described more fully with reference to the drawings. Example embodiments, however, can be embodied in a variety of forms and should not be construed as being limited to examples set forth herein. Instead, these embodiments are provided so that the present disclosure will be thorough and complete, and will fully convey concepts of the example embodiments to those skilled in the art. The described features, structures or characteristics may be combined in any suitable manner in one or more embodiments.

In addition, the drawings are merely schematic illustrations of the present disclosure and are not necessarily drawn to scale. The same reference numerals in the figures denote the same or similar parts, and thus their repeated description will be omitted. Some of the block diagrams shown in the drawings are functional entities and do not necessarily correspond to physically or logically separate entities. These functional entities may be implemented in software, or in one or more hardware modules or integrated circuits, or in different networks and/or processor devices and/or micro-controller devices.

In some technical solutions, in order to solve the problem of quick editing of the mind map through a terminal device, the following solution can be implemented: S1, a mind map editing page is entered, a text is entered after the an item symbol (a dot) by using a keyboard, and the content following the item symbol corresponds to a theme of the mind map; S2, a new line is generated by using the Enter key on the keyboard of a mobile phone, a new item symbol is automatically generated after the new line is generated, a text is entered behind the new item symbol, and a new theme node is formed; and S3, a position of the item symbol is indented in/out by clicking on the "←" and "→" icons. The larger an indentation value is, the lower a corresponding level in the mind map is.

However, the above solution has the following drawbacks. It is required inputting the text through other input media, and realizing a hierarchical logic of the mind map through the Enter key and "←" and "→" icons, resulting in low intelligence. Moreover, conventional mind maps used for the touch integrated machine require the user to type and input a content through the keyboard at each theme node, which is cumbersome and does not meet actual operational requirements of the touch integrated machine.

Embodiments of the present disclosure first provide a display system. The display system can include an intelligent interactive tablet, which can be applied in various scenarios such as conferences, teaching, and commerce. The intelligent interactive tablet has interactive functions such as touch. The intelligent interactive tablet is large in size (for example, generally larger than 50 inches), and is installed with software such as handwriting, wireless projection, and remote video conferences. For example, in the scenario of a remote video conference, the video conference can be held based on the intelligent interactive tablet. During the conference, a conference content can be written on the intelligent interactive tablet based on the handwriting software, and so on. As shown in FIG. 1, the display system 100 can include a display 110, a processor 120, and an input component, which can include a touch component. It should be noted that the processor can include a processor arranged on a cloud server or a local processor arranged on the intelligent interactive tablet, which are not specially limited in embodiments.

In some embodiments, the processor is configured to control the display to display an interaction interface. The processor is further configured to receive a trajectory point sequence inputted by a user through the input component. The processor is further configured to generate a first content in response to a user input and control the display to display the first content. In some embodiments, the trajectory point sequence includes a first identification sequence, and the processor is configured to recognize the first identification sequence inputted by the user for the first content, determine a first feature identifier corresponding to the first content, and determine a cluster relationship of the first content based on the first feature identifier. The processor is further configured to generate a display region in a preset format based on the cluster relationship, and control the display to display the display region on the interaction interface. In some embodiments, the display region includes the cluster relationship, and a standardized text corresponding to the first content.

The display system provided in embodiments of the present disclosure, on the one hand, can receive the trajectory point sequence inputted by the user through the input component, and then generate the first content in response to the user's input and display the first content. The display system then identifies through the processor the first identification sequence inputted by the user for the first content, determines the first feature identifier corresponding to the first content, and determines the cluster relationship of the first content based on the first feature identifier. Finally, the display system generates through the processor the display region in a preset format based on the cluster relationship, and controls the display to display the display region on the interaction interface. There is no need to input the content that is required to generate the display region through an external device, and also, there is no need to adjust the relative position of the content through the external device, thereby improving the convenience and efficiency of generating the display region. On the other hand, according to embodiments of the present disclosure, the automatic generation of the required display region based on the trajectory point sequence inputted by the user can be achieved, the cluster relationship of the first content can be determined based on the first feature identifier, and the display region in a preset format is then generated based on the cluster relationship, thereby improving the efficiency of the generation of the display region and the accuracy of the display region.

Detailed explanation and description of the display system in embodiments of the present disclosure will be provided in the following in conjunction with the drawings.

First, purposes of embodiments of the present disclosure will be explained and described. Specifically, the display system provided in embodiments of the present disclosure achieves a purpose of generating a standard mind map by recognizing the content and hierarchy of the theme inputted by the user through handwriting. During an input process, the user can add a corresponding first feature identifier before each corresponding theme. The corresponding cluster relationship of the theme can be determined based on the first feature identifier, and the corresponding hierarchy of the theme can then be determined based on the cluster relationship. For example, when the first feature identifier is a dot, one dot is drawn as a first first-level theme of the mind map, two dots are drawn as a second-level theme of the previous mind map, one diamond is drawn as a second first-level theme of the mind map, and two diamonds are drawn as a subordinate sub theme of the theme presented by one diamond. In some embodiments, the feature identifier can also include digits, colors, and so on, which are not specially limited in embodiments.

In some embodiments, when a user needs to input characters in the display region, an interactive control in the display region can be touched, and a preset mode (for example, a mind map mode) can be entered. The input component is configured accordingly, and then input through specific input devices (for example, a capacitive pen, or other input devices, which are not specially limited in examples) is conducted, to obtain a trajectory point sequence. In some embodiments, the processor will generate corresponding handwriting information based on the trajectory point sequence inputted by the user, and control the display to display the handwriting. When generating the handwriting information, it should be based on color, line width, transparency, and stroke beautification, etc. That is, when generating the handwriting information, the handwriting information needs to include information such as line color, line width, line transparency, and stroke of the current handwriting information determined by the user through the input component, to ensure the accuracy of the handwriting information.

It should be noted that the input component can be a touch component, such as an infrared touch component, a capacitive touch component, or an electromagnetic touch component. The touch components mentioned above are used to receive touch point inputs from users on a touch screen through fingers or stylus, thereby generating the sequence point information.

In some embodiments, the input component can also be a data transmission component. For example, in some display systems, the display system itself does not have a touch component. When implementing interactive functions, information input can be achieved through data transmission components such as WiFi and Bluetooth, and the user's mobile terminal or a specialized sub control terminal used to control the display system. For example, in the commercial display field, a large-sized display system has a sub control terminal, which can generally be a tablet with touch function, and users can input the trajectory point sequence on the tablet. The trajectory point sequence is transmitted to the large-sized display system through a data transmission module such as WiFi and Bluetooth. The large-sized display system also has a data transmission module as an input component, which is used to receive the trajectory point sequence sent by the tablet.

In some embodiments, in a specific application scenario (such as a meeting scenario, which can include multiple attendees, and among the multiple attendees, users who can directly input on the display region, or other users who cannot directly input on the display region in the meeting room are included), a current user (such as a conference host) can directly input the trajectory point sequence through a capacitive pen or a finger interaction interface, and other users (other attendees) can input through other mobile terminal devices, such as mobile phones, tablets, or notepads, and send the input content to a conference integrated machine in the form of notes.

In some embodiments, in a generating process, the first content can be generated through following steps: the first content is generated based on a first content sequence included in the trajectory point sequence and/or a second content sequence included in the interaction interface. In some embodiments, the first content can include text information, which can include a standardized text (i.e., the text has a standard format, and the standard format can include a printing format), as well as a non-standardized text, and the non-standardized text can include handwriting. In some embodiments, in the process of generating the first content based on the second content sequence, it is also necessary to perform a selection operation on the second content sequence. That is, the first content is generated, in response to a selection operation from the user on the second content sequence, based on the second content sequence and/or the first content sequence. In some embodiments, the first content sequence and the second content sequence mentioned above refer to some touch trajectory points received by the input component, which include a series of trajectory point information. Each trajectory point can include dimension information such as xyt, where xy represents the horizontal and vertical coordinates, and t represents an input time sequence. In some embodiments, when it is necessary to generate the first content based on the content on a note, the note can be selected and the first content can be generated based on the second content sequence on the note. In some embodiments, the second content sequence in the form of the note can be an image generated locally on the interaction interface, or it can be inputted by other users through other display systems, which are not specially limited in embodiments of the present disclosure.

In some embodiments, in a generating process, the first content can be generated through following steps: the first content is generated in response to an insertion input operation from a user. For example, the user inserts an image, which contains a text, in the handwriting software interface of the display system. The processor receives the image inserted by the user, controls rendering to generate the first content, and controls the display to display the first content. During the process of generating the first content, a corresponding handwriting content can be generated based on the trajectory sequence and displayed. In some embodiments, in order to generate a corresponding display region, it is necessary to convert the handwriting content into a standard font content. In some embodiments, a standardized text can be obtained through following steps: the first content is recognized in response to the first identification sequence inputted by the user for the first content, to obtain the standardized text corresponding to the first content. In a specific recognition process, a standard text content corresponding to the trajectory point sequence can be obtained (the Song script, the regular script) and the display screen can be controlled to display the standard text content. In some embodiments, the first content itself can also include standard text content. It should be noted that the standard text content is generally displayed in the format of images.

In some embodiments, the trajectory point sequence mentioned above can include a first content sequence, which refers to a sequence of touch points inputted by the user through an input device. For example, in a meeting scenario, the sequence of touch points can be used to represent specific meeting content, or in a teaching scenario, the sequence of touch points can be used to represent specific teaching content, etc. In some embodiments, the first content can be generated based on the first content sequence. In some embodiments, the first content sequence refers to the handwriting, but the handwriting cannot be completely equivalent to the first content sequence, as the handwriting also has parameters such as style, line width, and stroke. The first content can refer to the recognized content given in standard font. For example, if the user inputs a "Weather Forecast", and the "Weather Forecast" is recognized, then the "Weather Forecast" given in the standard font (printed fonts such as Song/regular script) can be directly displayed on the interaction interface. Reference can be made to FIG. 2 for this specific example.

In some embodiments, the trajectory point sequence mentioned above can further include a first identification sequence inputted for the first content. In specific applications, after completing the input of the first content sequence, the user will organize the already input content (a first feature identifier is configured for each input content). In such scenario, a corresponding first feature identifier can be configured for the first content according to actual needs.

In some embodiments, in the process of recognizing the first feature identifier, it can be achieved through following steps: whether the first identification sequence constitutes a closed pattern is determined, a recognition is performed if the first identification sequence constitutes a closed pattern, and the trajectory point sequence is continued to receive within a threshold time range if the first identification sequence does not constitute a closed pattern. That is, if it is determined that no new trajectory points are received within a preset time range after a first ending time for a last trajectory point sequence of the first identification sequence, a step of recognizing the first identification sequence is executed. For example, the preset time range can be the time for inputting the last trajectory point. If a new trajectory point is received, the first identification sequence inputted by the user is continuously received. In some embodiments, in practical applications, a specific judgment rule is as follows: after the user finishes writing one stroke, where 'a' is assumed as a starting point, and 'b' is assumed as an ending point for this stroke trajectory, and then a following stroke 2 is written, where 'c' is assumed as a starting point for this stroke trajectory. 'TimeInterval' represents a time interval, and if (the TimeInterval between pen-down of the current stroke 2 and pen-up of the previous stroke 1 is >1 s), then 'Reset1' (the current stroke 2 is regarded as a first stroke of a pattern, and all variables become default values) is set, and the recognition is performed on the trajectory points; if not (TimeInterval≤1 s), it continues to receive the trajectory points.

In some embodiments, when the user inputs through the capacitive pen, the display device would have turned on a handwriting recognition button, and then the handwriting recognition algorithm can be started when the time interval is not within the preset time range. The handwriting recognition algorithm can recognize a single pattern or multiple patterns. In some embodiments, the recognition on the single pattern can recognize a single hand-drawn pattern, and the recognition on the multiple patterns can recognize multiple consecutive hand-drawn patterns. In some embodiments, in order to improve the accuracy of recognition results, when recognizing multiple patterns, the two patterns need to be independent from each other. Therefore, in some embodiments, in order to avoid above problem, in the process of recognizing the first identification sequence, it is also necessary to divide the first identification sequence into independent trajectory point sequences. In some embodiments, in the specific recognition process, a specific judgment rule is as follows: when the user finishes writing one stroke 1, where 'a' is assumed as a starting point, and 'b' is assumed as an ending point for this stroke trajectory, and then a following stroke 2 is written, where 'c' is assumed as a starting point for this stroke trajectory. 'Dis' represents a first Euclidean distance between a first position coordinate of a first trajectory point and a third position coordinate of a third trajectory point, and if (dis (a, c)>20 and dis (b, c)>20 pixels), then a graph category is (the current stroke 2) unrecognized, 'Reset2' (a stroke count variable is not reset (the stroke count is counted), and other variables except for the stroke count variable become default values (a connection between the third trajectory point and the first trajectory point is cut off) is set, and trajectory points of the first stroke (stroke 1) and trajectory points of the second stroke (stroke 2) are treated as independent trajectory point sequences; otherwise (dis (a, c)≤20 or dis (b, c)≤20 pixels), steps where the Euclidean distance is calculated and where the Euclidean distance is judged are repeated until a condition that the Euclidean distances are greater than the preset distance threshold is met. As a result, multiple independent trajectory point sequences can be obtained. According to embodiments of the present disclosure, the accuracy of the generated first feature identifier can be improved.

Figure 3:
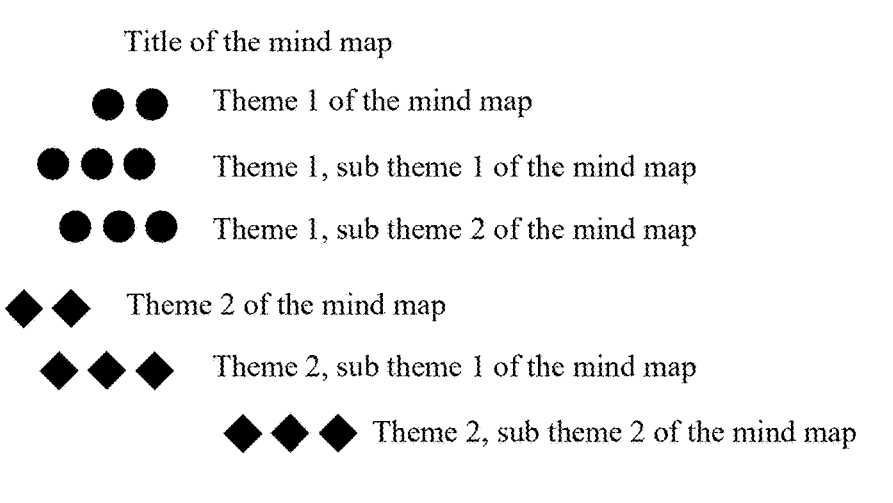
FIG. 3 schematically illustrates an example diagram of a first content and a first feature identifier according to embodiments of the present disclosure.

FIG. 3 schematically illustrates an example diagram of a first content and a first feature identifier according to embodiments of the present disclosure. As shown in FIG. 3, in specific application scenarios, the first identification sequence can be recognized by using the processor, the first feature identifier corresponding to the first content can be determined, and the cluster relationship of the first content can be determined based on the first feature identifier. In some embodiments, the group relationship and the subordinate relationship can be recognized through following steps: the first content is grouped based on the first feature identifier to obtain the group relationship between first recognition results, and the subordinate relationship corresponding to the first content included in a same group is then determined based on the first feature identifier corresponding to the first content included in the same group.

In some embodiments, the first feature identifier mentioned above can include an image identifier, a digital identifier, a first combination identifier including additional attributes and graphic categories, a second combination identifier including additional attributes and digits, and the like. Additional attributes include color, and/or thickness of the stroke. The image identifier can include square, circle, triangle, rectangle, diamond, trapezoid, pentagon, regular hexagon, etc. Additional attributes can also include other graphics, such as ellipse and other irregular graphics, etc., which is not specially limited in embodiments of the present disclosure. Digital identifiers can be, for example, Arabic numerals such as 1, 2, 3, 4, . . . , Roman characters such as I, II, III, IV, . . . , or English numerals one, two, three, four, . . . , etc., which is not specially limited in embodiments of the present disclosure. The first combination identifier can be, for example, a combination of yellow and a square, red and a rectangular, a diamond with thick handwriting, blue and a triangle with thin handwriting, etc. The second combination identifier can be a combination of '1' and green, or a combination of 'I' and orange, green and 'one' with thick or thin handwriting, etc. In practical applications, it can be selected according to actual needs, which is not specially limited in embodiments of the present disclosure. According to the methods provided in embodiments of the present disclosure, the variety of first feature identifiers can be increased, thereby avoiding the low accuracy in the generation of the display region caused by using the same first feature identifier to label different themes.

In some embodiments, the group relationship corresponding to the first content can be determined through following steps: the first content with the same type of the first feature identifier is extracted from the first content, and is taken as the same group. In some embodiments, as shown in FIG. 3, the first content with a first identifier of a circular can be used as one group, and the first content with a first identifier of a diamond can be used as another group. Alternatively, the first content with a first combination identifier composed of a triangle and red is used as one group, and the first content with a second combination identifier composed of a rectangle and green is used as another group. Alternatively, in scenarios where a group relationship and a subordinate relationship are determined based on the digital identifier, the first content with the first identifier such as 1, 1.1, 1.2, 1.1.1, etc., can be directly used as one group, and the first content with the first identifier such as 2, 2.1, 2.2, 2.1.1, etc., can be used as another group. In some embodiments, after grouping is completed, the first feature identifier corresponding to the first content needs to be displayed on the display region, as shown in FIG. 3.

In some embodiments, since the first feature identifier can also include a quantity attribute, the group relationship corresponding to the first content can also be determined through following steps: the subordinate relationship corresponding to the first content included in the group is determined based on the quantities of image identifiers corresponding to the first content included in the same group. In some embodiments, the subordinate relationship corresponding to the first content included in the group can be determined based on a hierarchical logic of digital identifiers corresponding to the first content included in the same group (i.e., the subordinate relationship can be directly determined based on the digital identifiers). In some embodiments, the indentation value in a positional relationship corresponding to the first content included in the same group can also be determined based on the subordinate relationship. The more a position is indented, the lower the level of a first recognition result is.

In some embodiments, in the process of determining the subordinate relationship, a hierarchical relationship (subordinate relationship) corresponding to the first content included in the same group can be determined through the quantity of first feature identifiers corresponding to the first content in a line. In some embodiments, one graph (circle, rectangle, or other) is regarded as a first level in the mind map (first-level theme), two graphs (circle, rectangle, or other) are regarded as a second level in the mind map (two second-level themes of the first-level theme), and so on. Paragraphs without first feature identifiers will not be inserted into the mind map. In some embodiments, the hierarchical relationship and the cluster relationship can be determined through a sequence number. For example, the sequence number ahead of the first-level theme is "1", "2", "3", etc., the sequence number ahead of the second-level theme is "1.1", "1.2", "2.1", etc., and the sequence number ahead of the third-level theme is "1.1.1", "2.2.3", etc. In some embodiments, the subordinate relationship in the same group is determined through the indentation relationship of each line of content. The more the position of a level is indented, the lower the level is. For example, those indented by two words are used as a second-level theme, and those indented by four words are used as a third-level theme, and so on.

Figure 4:
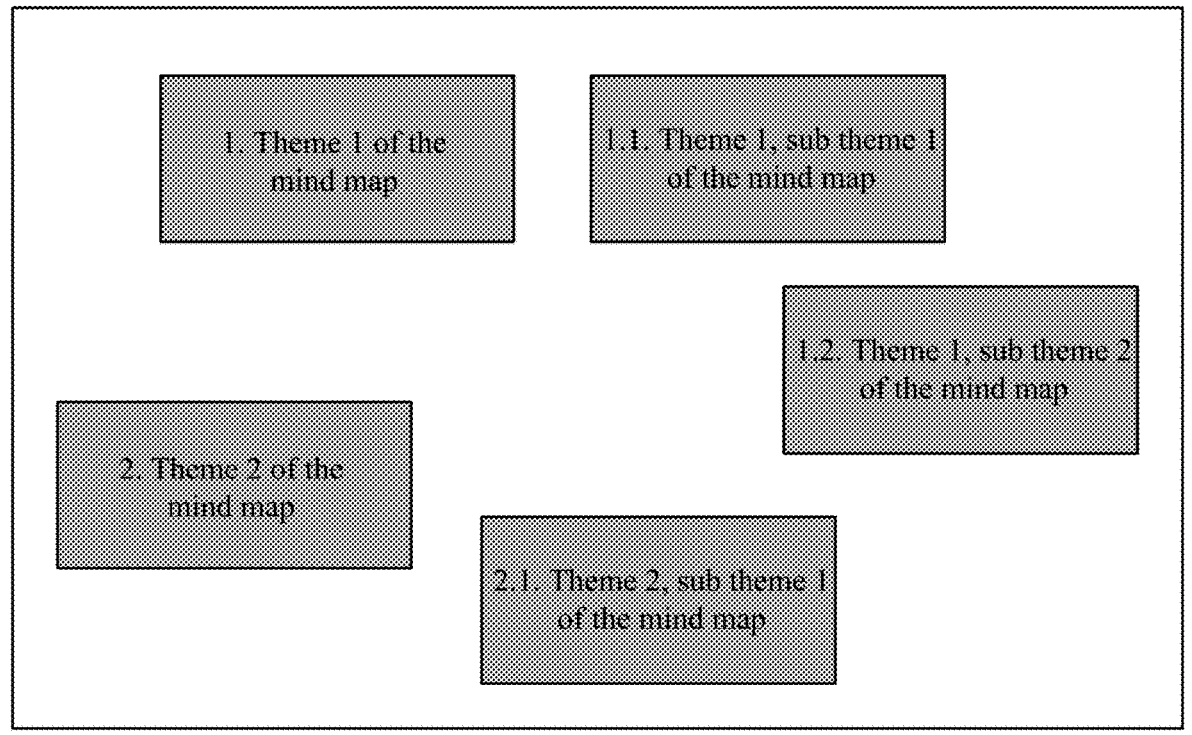
FIG. 4 schematically illustrates an example diagram of other trajectory point sequences presented in the form of a note according to embodiments of the present disclosure.
Figure 5:
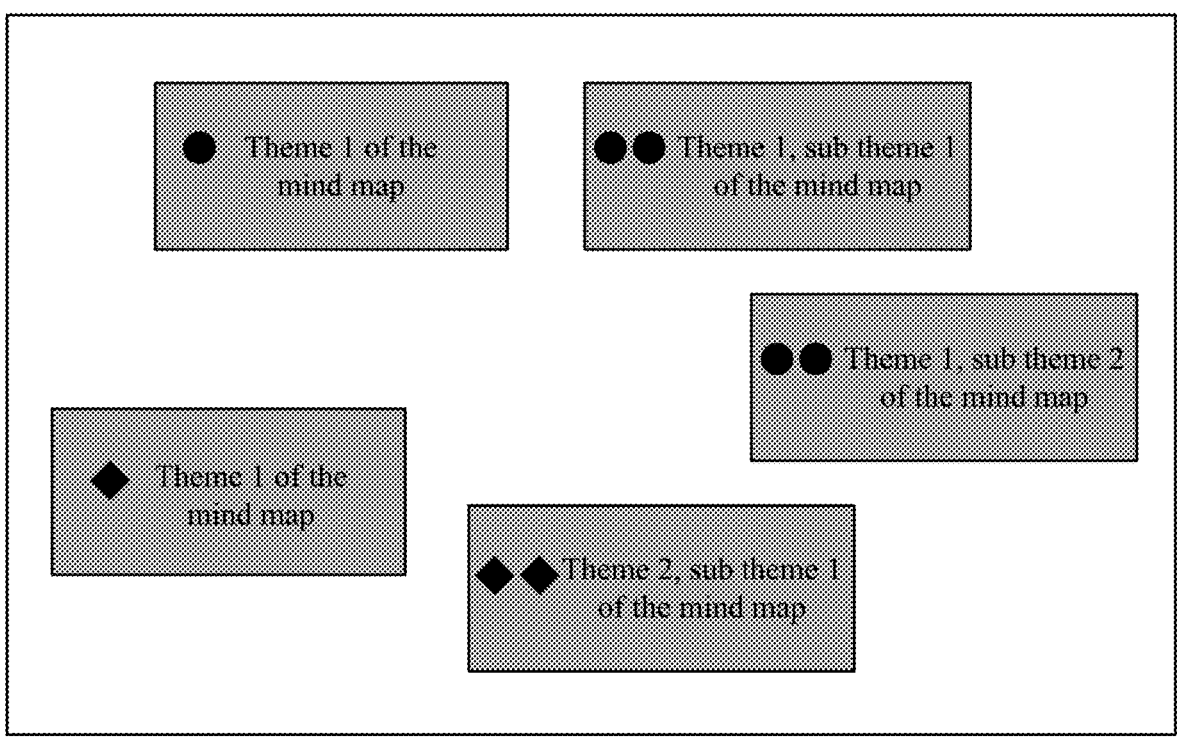
FIG. 5 schematically illustrates another example diagram of other trajectory point sequences presented in the form of a note according to embodiments of the present disclosure.

It should be noted that in the process of determining the group relationship and the subordinate relationship of other trajectory point sequences presented in the form of notes, the same method through which the group relationship and the subordinate relationship of the current trajectory point sequence inputted by a current user are determined can be used. In some embodiments, groups and levels can be divided based on a sequence number of the note content, that is, groups and levels can be divided based on the sequence number of each content. For example, "1" and "2" are regarded as first-level themes, and "1.1" and "1.1.3" are sub themes under the corresponding the first-level theme of "1". In some embodiments, groups and levels can be determined based on a shape and a quantity of the graph ahead of each note. For example, a group 1 for those whose shapes are circular, a group 2 for those whose shapes are triangular. In Group 1, the hierarchy is divided based on the quantity of circles, with one circle being regarded as the first-level theme (the one and the only) and two circles being regarded as the second-level theme, and so on. As a result, all the group relationship and the subordinate relationship can be obtained, as shown in FIGS. 4 and 5.

In some embodiments, the processor is further configured to determine at least one node and determine a subordinate identifier corresponding to the node. When it is determined that the first feature identifier corresponding to the first content and the subordinate identifier corresponding to the node are consistent, the first content is regarded as a child node of that node. In some embodiments, in specific application scenarios, one node can be determined first, and the node is regarded as a "mind map body". The subordinate identifier corresponding to the node can then be determined, for example, a circle or a rectangle. Next, for each first feature identifier, whether the first feature identifier is consistent with the subordinate identifier is determined. If the first feature identifier is consistent with the subordinate identifier, the first content is regarded as a child node of the node and added to a corresponding position. After all of the first content has been added, the node and its subordinate identifiers can be displayed in the display region.

Figure 6:
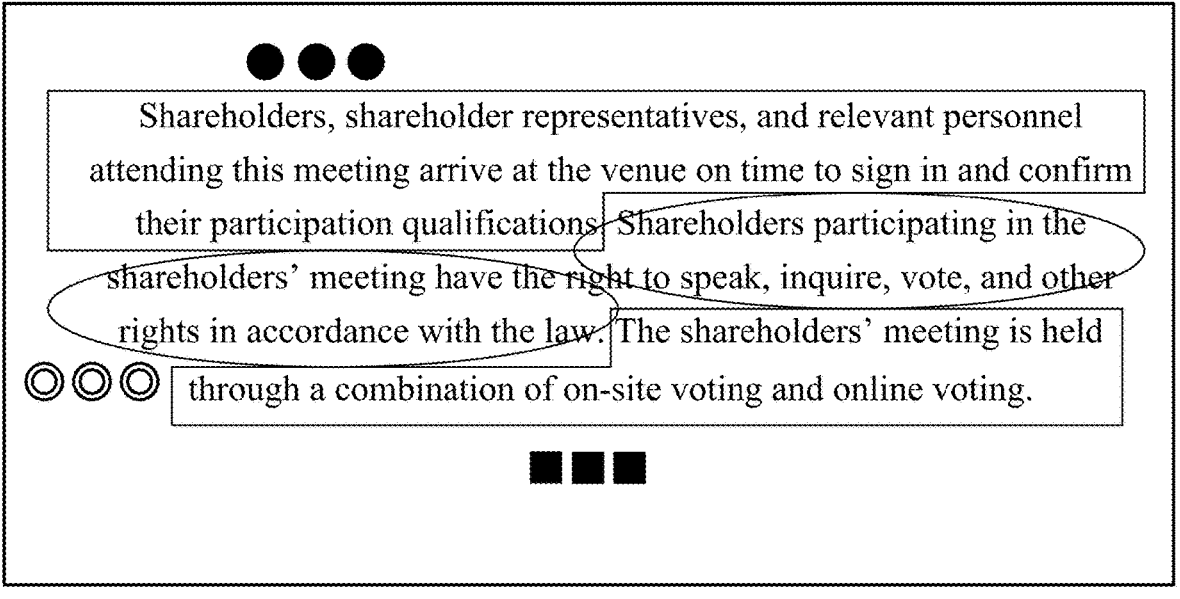
FIG. 6 schematically illustrates an example diagram of a scenario for configuring a first feature identifier for a first content according to embodiments of the present disclosure.

In some embodiments, if there is too much continuous input content on the interaction interface, the continuous input content exists in the same line or paragraph, and the content included in the line and/or paragraph needs to correspond to multiple different first identification sequences. In such scenario, the first identification sequence can be configured for the content through following steps: in response to a selection operation from a user for the first content, the first content selected by the user is determined, and the first identification sequence inputted by the user for the first content selected by the user is received through the input component. For example, as shown in FIG. 6, the input content on the interaction interface is: shareholders, shareholder representatives, and relevant personnel attending this meeting arrive at the venue on time to sign in and confirm their participation qualifications. Shareholders participating in the shareholders' meeting have the right to speak, inquire, vote, and other rights in accordance with the law. The shareholders' meeting is held through a combination of on-site voting and online voting. A corresponding part can be directly selected through a box, and a corresponding first identification sequence is assigned to the selected part. For example, after the first content in the box is selected, the first identification sequence is input on the interaction interface, and the first feature identifier obtained based on the first identification sequence is assigned to the first content in the box. When inputting the first identification sequence, an input position can overlap with the selected content in position, so as to facilitate the assignment of the first identification sequence to the first content in the overlapped position. When inputting the first identification sequence, the input position may also not overlap with the selected content in position, and the first identification sequence will be assigned to the latest selected first content. In the specific application process, the corresponding first identification sequence can be input according to actual needs, which is not specially limited in embodiments of the present disclosure.

Figure 7:
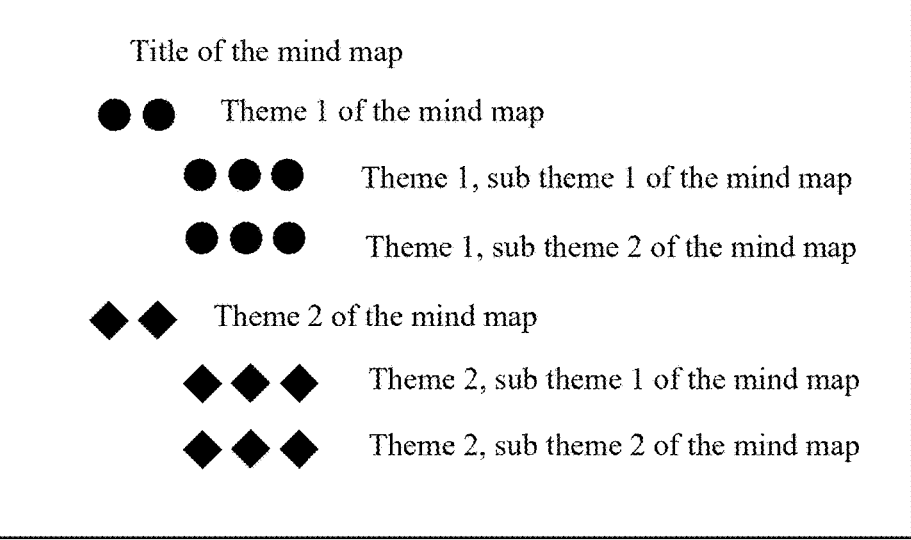
FIG. 7 schematically illustrates an example diagram of a display region in a first preset format according to embodiments of the present disclosure.

FIG. 7 schematically illustrates an example diagram of a display region in a first preset format according to embodiments of the present disclosure. In some embodiments, after obtaining the group relationship and the subordinate relationship included in the first content, the first content can be sequentially arranged according to a preset arrangement rule based on the group relationship and subordinate relationship, and thus a display region in a first preset format as shown in FIG. 7 will be obtained. The preset arrangement rule can include arrangement sequentially from left to right, or arrangement sequentially from top to bottom, which is not specially limited in embodiments of the present disclosure.

Figure 8:
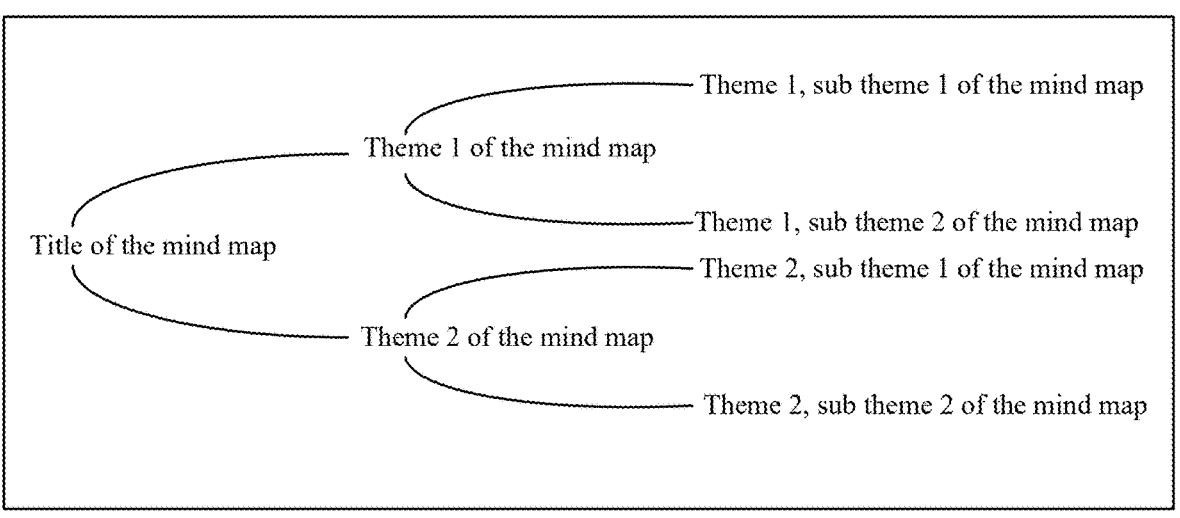
FIG. 8 schematically illustrates an example diagram of a display region in a second preset format according to embodiments of the present disclosure.

FIG. 8 schematically illustrates an example diagram of a display region in a second preset format according to embodiments of the present disclosure. In some embodiments, after obtaining the display region in the first preset format, in response to a first touch command on the interaction interface exerted by the user, the display region in the first preset format can also be converted to the display region in the second preset format, as shown in FIG. 8, so that the user can view the display region in the second preset format. In some embodiments, the first touch command can be used to simultaneously touch the interaction interface through multiple fingers, or other touch commands, which is not specially limited in embodiments of the present disclosure. The display region in the second preset format can be a mind map with a standard layout, as shown in FIG. 8.

In some embodiments, if it is necessary to edit the mind map with a standard layout again, the display region in the second preset format can be converted to the display region in the first preset format, in response to a second touch command on the interaction interface exerted by the user. The display region in the first preset format can then be edited again, and the generating of the display region mentioned above will be repeated, so as to obtain a more accurate mind map. As a result, the accuracy of the generated mind map can be further improved, thereby enhancing the user experience of using the conference integrated machine.

Figure 9:
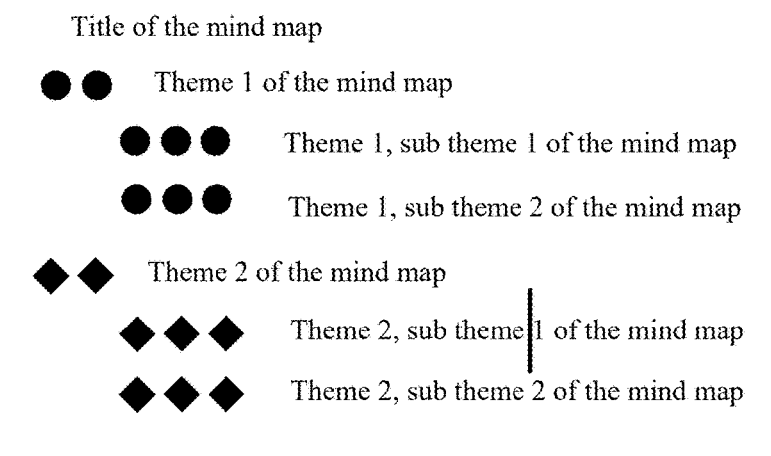
FIG. 9 schematically illustrates an example diagram of an insertion symbol according to embodiments of the present disclosure.

In some embodiments, during the process of editing the display region in the first preset format again, the processor is further configured to generate an insertion symbol in response to a third touch command at a first preset position in the first content exerted by the user. In some embodiments, the preset position includes any position in the first content. The newly added trajectory point sequence inputted by the user is inserted based on the position where the insertion symbol is located. In some embodiments, as shown in FIG. 9, the insertion symbol can be a vertical line, or the insertion symbol can be a space occupying 1 character. The insertion symbol can be placed at any position, for example, in front of the first character, between any two characters, or at the end of the last character, etc., which is not specially limited in embodiments of the present disclosure.

Figure 10:
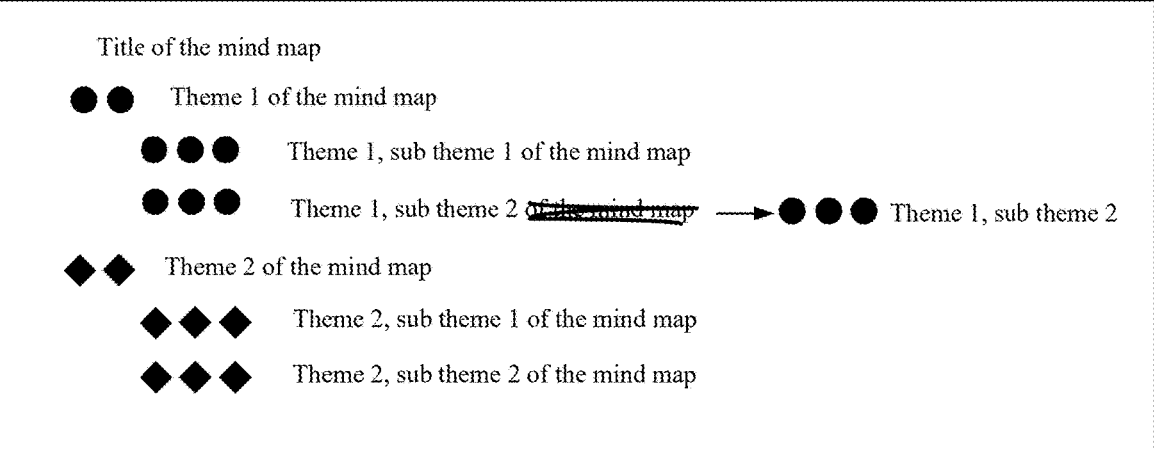
FIG. 10 schematically illustrates an example diagram of a deletion symbol according to embodiments of the present disclosure.

In some embodiments, during the process of editing the display region in the first preset format again, the processor is further configured to generate a deletion symbol in response to a fourth touch command at a second preset position in the first content exerted by the user. In some embodiments, the second preset position includes a position where any character and/or image in the first content is located. Based on the position where the deletion symbol is located, the characters and/or images corresponding to the position is deleted. In some embodiments, as shown in FIG. 10, the deletion symbol can be a folded line with folded times greater than or equal to 3 in a horizontal (also can be vertical or inclined) direction on a certain character, or other symbols, which is not specially limited in embodiments of the present disclosure.

It should be noted that by setting the insertion symbol and the deletion symbol, users can insert and delete characters according to their actual needs, thereby improving the accuracy of the input trajectory point sequence to be recognized and the cleanliness of a page, thereby improving the user experience.

Figure 11:
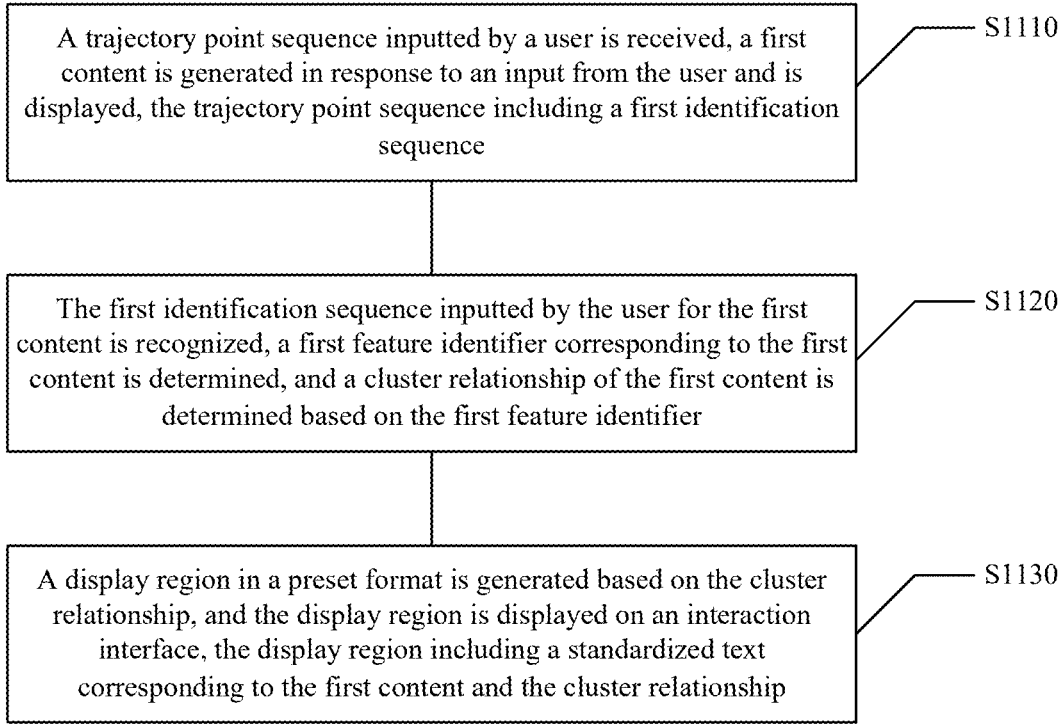
FIG. 11 schematically illustrates a flowchart of a method for processing a trajectory point sequence according to embodiments of the present disclosure.
Figure 12:
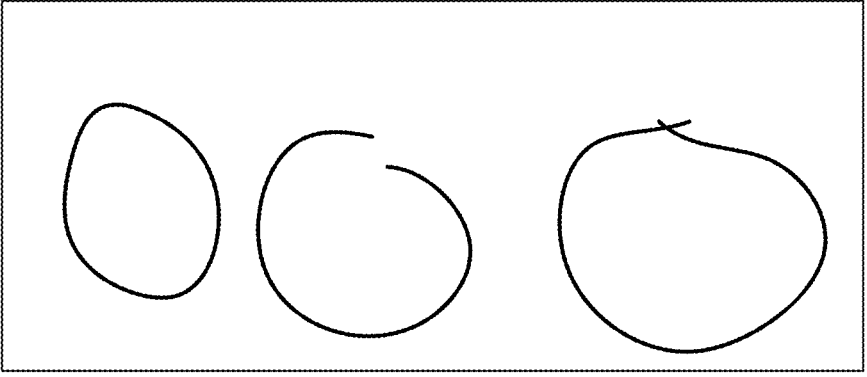
FIG. 12 schematically illustrates an example diagram of a first identification sequence corresponding to a first feature identifier of circle according to embodiments of the present disclosure.
Figure 13:
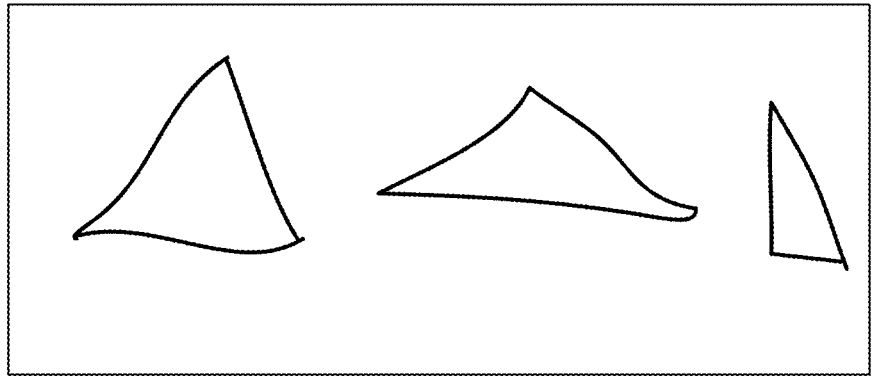
FIG. 13 schematically illustrates an example diagram of a first identification sequence corresponding to a first feature identifier of a triangle according to embodiments of the present disclosure.
Figure 14:
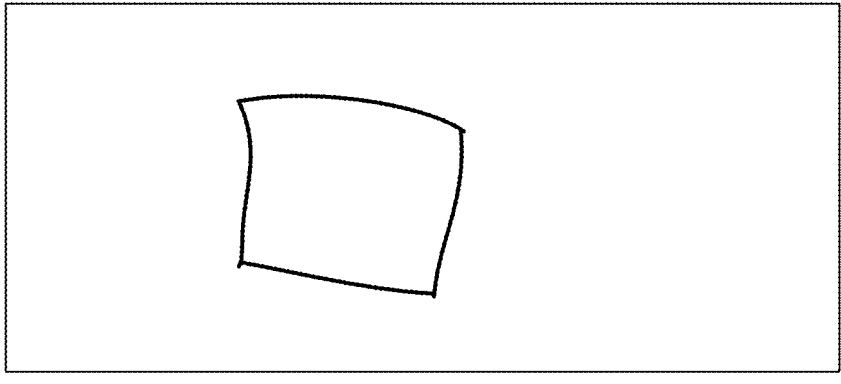
FIG. 14 schematically illustrates an example diagram of a first identification sequence corresponding to a first feature identifier of a rectangle according to embodiments of the present disclosure.
Figure 15:
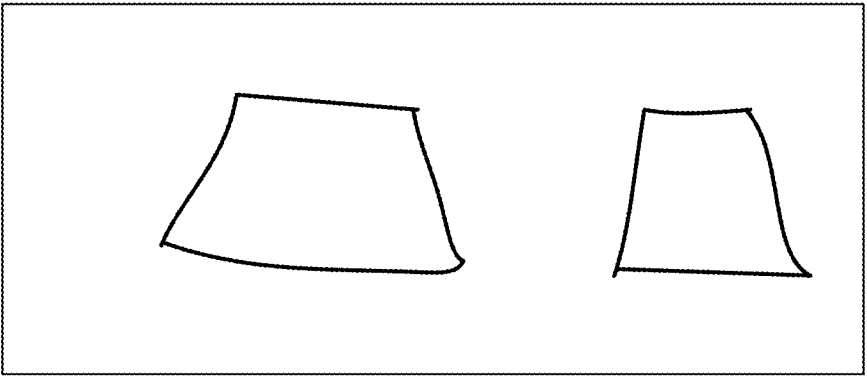
FIG. 15 schematically illustrates an example diagram of a first identification sequence corresponding to a first feature identifier of a trapezoid according to embodiments of the present disclosure.
Figure 16:
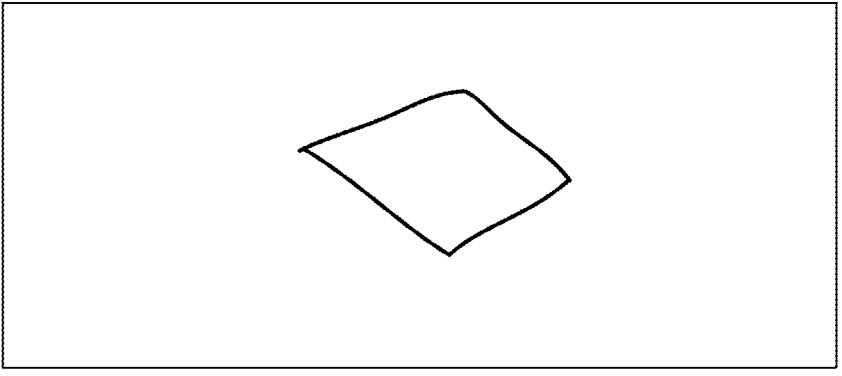
FIG. 16 schematically illustrates an example diagram of a first identification sequence corresponding to a first feature identifier of a diamond according to embodiments of the present disclosure.
Figure 17:
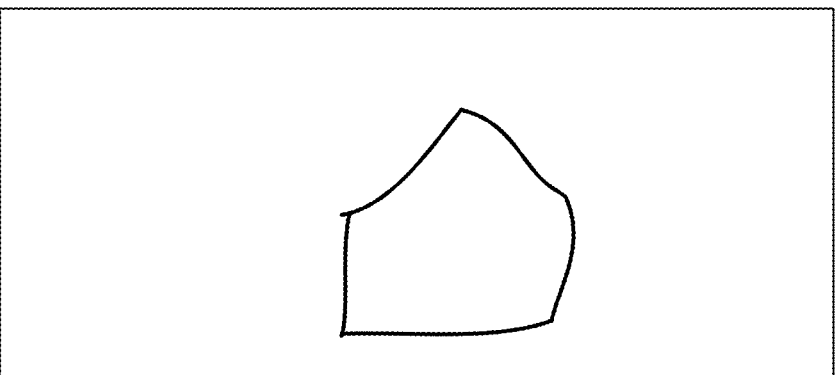
FIG. 17 schematically illustrates an example diagram of a first identification sequence corresponding to a first feature identifier of a pentagon according to embodiments of the present disclosure.

Embodiments of the present disclosure also provide a method for processing a trajectory point sequence, which can be run on a display system. The display system can include, for example, an intelligent interactive tablet, which can be applied in various scenarios such as conferences, teaching, and commerce. The intelligent interactive tablet has interactive functions such as touch. The intelligent interactive tablet is large in size (for example, generally larger than 50 inches), and is installed with software such as handwriting, wireless projection, and remote video conferences. For example, in the scenario of a remote video conference, the video conference can be held based on the intelligent interactive tablet. During the conference, a conference content can be written on the intelligent interactive tablet based on the handwriting software, and so on. In some embodiments, the method for processing the trajectory point sequence can also be run on servers, server clusters, or cloud servers, etc. Those killed in the art can run the method on other platforms according to their needs, which is not specially limited in embodiments of the present disclosure. As shown in FIG. 11, the method for processing the trajectory point sequence can include the following steps.

Step S1110, a trajectory point sequence inputted by a user is received, a first content is generated in response to an input from the user and is displayed, the trajectory point sequence including a first identification sequence.

Step S1120, the first identification sequence inputted by the user for the first content is recognized, a first feature identifier corresponding to the first content is determined, and a cluster relationship of the first content is determined based on the first feature identifier.

Step S1130, a display region in a preset format is generated based on the cluster relationship, and the display region is displayed on an interaction interface, the display region including the cluster relationship and a standardized text corresponding to the first content.

In the method for processing the trajectory point sequence, on the one hand, the trajectory point sequence inputted by the user can be received, the first content is generated in response to the input from the user, and the first content is displayed. The first identification sequence inputted by the user for the first content is then recognized, the first feature identifier corresponding to the first content is determined, and the cluster relationship of the first content is determined based on the first feature identifier. Finally, based on the cluster relationship, a display region is generated and displayed on the interaction interface. There is no need to input the content that is required to generate the display region through an external device, and also, there is no need to adjust the relative position of the content through the external device, thereby improving the convenience and efficiency of generating the display region. On the other hand, according to embodiments of the present disclosure, the automatic generation of the required display region based on the trajectory point sequence inputted by the user can be achieved, the cluster relationship of the first content can be determined based on the first feature identifier, and the display region in a preset format is then generated based on the cluster relationship, thereby improving the efficiency of the generation of the display region and the accuracy of the display region.

Detailed explanation and description of the method for processing the trajectory point sequence in embodiments of the present disclosure will be provided in the following in conjunction with the drawings.

In step S1110, a trajectory point sequence inputted by a user is received, a first content is generated in response to an input from the user and is displayed, the trajectory point sequence including a first identification sequence.

In some embodiments, first, when a user needs to input characters in the display region, an interactive control in the display region can be touched, and a preset mode (for example, a mind map mode) can be entered. The input component is configured accordingly, and then input through specific input devices is conducted, to obtain a trajectory point sequence. In some embodiments, the processor will generate corresponding handwriting information based on the trajectory point sequence inputted by the user, and control the display to display the handwriting. When generating the handwriting information, it should be based on color, line width, transparency, and stroke beautification, etc. That is, when generating the handwriting information, the handwriting information needs to include information such as line color, line width, line transparency, and stroke of the current handwriting information determined by the user through the input component, to ensure the accuracy of the handwriting information.

It should be noted that the input component can be a touch component, such as an infrared touch component, a capacitive touch component, or an electromagnetic touch component. The touch components mentioned above are used to receive touch point inputs from users on a touch screen through fingers or stylus, thereby generating the sequence point information.

In some embodiments, the input component can also be a data transmission component. For example, in some display systems, the display system itself does not have a touch component. When implementing interactive functions, information input can be achieved through data transmission components such as WiFi and Bluetooth, and the user's mobile terminal or a specialized sub control terminal used to control the display system. For example, in the commercial display field, a large-sized display system has a sub control terminal, which can generally be a tablet with touch function, and users can input the trajectory point sequence on the tablet. The trajectory point sequence is transmitted to the large-sized display system through a data transmission module such as WiFi and Bluetooth. The large-sized display system also has a data transmission module as an input component, which is used to receive the trajectory point sequence sent by the tablet.

In some embodiments, in a specific application scenario (such as a meeting scenario, which can include multiple attendees, and among the multiple attendees, users who can directly input in the display region, or other users who cannot directly input in the display region in the meeting room are included), a current user (such as a conference host) can directly input the trajectory point sequence through a capacitive pen or a finger interaction interface, and other users (other attendees) can input through other mobile terminal devices, such as mobile phones, tablets, or notepads, and send the input content to a conference integrated machine in the form of notes.

In some embodiments, in a generating process, the first content can be generated through following steps: the first content is generated based on a first content sequence included in the trajectory point sequence and/or a second content sequence included in the interaction interface. In some embodiments, the first content can include text information, which can include a standardized text (i.e., the text has a standard format, and the standard format can include a printing format), as well as a non-standardized text, and the non-standardized text can include handwriting. In some embodiments, in the process of generating the first content based on the second content sequence, it is also necessary to perform a selection operation on the second content sequence. That is, the first content is generated, in response to a selection operation from the user on the second content sequence, based on the second content sequence and/or the first content sequence. In some embodiments, the first content sequence and the second content sequence mentioned above refer to some touch trajectory points received by the input component, which include a series of trajectory point information. Each trajectory point can include dimension information such as xyt, where xy represents the horizontal and vertical coordinates, and t represents an input time sequence. In some embodiments, when it is necessary to generate the first content based on the content on a note, the note can be selected and the first content can be generated based on the second content sequence on the note. In some embodiments, the second content sequence in the form of the note can be an image generated locally on the interaction interface, or it can be inputted by other users through other display systems, which are not specially limited in embodiments of the present disclosure.

In some embodiments, in a generating process, the first content can be generated through following steps: the first content is generated in response to an insertion input operation from a user. For example, the user inserts an image, which contains a text, in the handwriting software interface of the display system. The processor receives the image inserted by the user, controls rendering to generate the first content, and controls the display to display the first content. During the process of generating the first content, a corresponding handwriting content can be generated based on the trajectory sequence and displayed. In some embodiments, in order to generate a corresponding display region, it is necessary to convert the handwriting content into a standard font content. In some embodiments, a standardized text can be obtained through following steps: the first content is recognized in response to the first identification sequence inputted by the user for the first content, to obtain the standardized text corresponding to the first content. In a specific recognition process, a standard text content corresponding to the trajectory point sequence can be obtained (the Song script, the regular script) and the display screen can be controlled to display the standard text content. In some embodiments, the first content itself can also include standard text content. It should be noted that the standard text content is generally displayed in the format of images.

In some embodiments, the trajectory point sequence mentioned above can include a first content sequence, which refers to a sequence of touch points inputted by the user through an input device. For example, in a meeting scenario, the sequence of touch points can be used to represent specific meeting content, or in a teaching scenario, the sequence of touch points can be used to represent specific teaching content, etc. In some embodiments, the first content can be generated based on the first content sequence. In some embodiments, the first content sequence refers to the handwriting, but the handwriting cannot be completely equivalent to the first content sequence, as the handwriting also has parameters such as style, line width, and stroke. The first content can refer to the recognized content given in standard font. For example, if the user inputs a "Weather Forecast", and the "Weather Forecast" is recognized, then the "Weather Forecast" given in the standard font (printed fonts such as Song/regular script) can be directly displayed on the interaction interface.

In step S1120, the first identification sequence inputted by the user for the first content is recognized, a first feature identifier corresponding to the first content is determined, and a cluster relationship of the first content is determined based on the first feature identifier.

In some embodiments, in the process of recognizing the first feature identifier, it can be achieved through following steps: whether the first identification sequence constitutes a closed pattern is determined, a recognition is performed if the first identification sequence constitutes a closed pattern, and the trajectory point sequence is continued to receive within a threshold time range if the first identification sequence does not constitute a closed pattern. That is, if it is determined that no new trajectory points are received within a preset time range after a first ending time for a last trajectory point sequence of the first identification sequence, a step of recognizing the first identification sequence is executed. For example, the preset time range can be the time for inputting the last trajectory point. If a new trajectory point is received, the first identification sequence inputted by the user is continuously received. In some embodiments, in practical applications, a specific judgment rule is as follows: after the user finishes writing one stroke, where 'a' is assumed as a starting point, and 'b' is assumed as an ending point for this stroke trajectory, and then a following stroke 2 is written, where 'c' is assumed as a starting point for this stroke trajectory. 'TimeInterval' represents a time interval, and if (the TimeInterval between pen-down of the current stroke 2 and pen-up of the previous stroke 1 is >1 s), then 'Reset1' (the current stroke 2 is regarded as a first stroke of a pattern, and all variables become default values) is set, and the recognition is performed on the trajectory points; if not (TimeInterval≤1 s), it continues to receive the trajectory points.

In some embodiments, when the user inputs through the capacitive pen, the display device would have turned on a handwriting recognition button, and then the handwriting recognition algorithm can be started when the time interval is not within the preset time range. The handwriting recognition algorithm can recognize a single pattern or multiple patterns. In some embodiments, the recognition on the single pattern can recognize a single hand-drawn pattern, and the recognition on the multiple patterns can recognize multiple consecutive hand-drawn patterns. In some embodiments, in order to improve the accuracy of recognition results, when recognizing multiple patterns, the two patterns need to be independent from each other.

Therefore, in some embodiments, in order to avoid above problem, in the process of recognizing the first identification sequence, it is also necessary to divide the first identification sequence into independent trajectory point sequences. In some embodiments, in the specific recognition process, a specific judgment rule is as follows: when the user finishes writing one stroke 1, where 'a' is assumed as a starting point, and 'b' is assumed as an ending point for this stroke trajectory, and then a following stroke 2 is written, where 'c' is assumed as a starting point for this stroke trajectory. 'Dis' represents a first Euclidean distance between a first position coordinate of a first trajectory point and a third position coordinate of a third trajectory point, and if (dis (a, c)>20 and dis (b, c)>20 pixels), then a graph category is (the current stroke 2) unrecognized, 'Reset2' (a stroke count variable is not reset (the stroke count is counted), and other variables except for the stroke count variable become default values (a connection between the third trajectory point and the first trajectory point is cut off) is set, and trajectory points of the first stroke (stroke 1) and trajectory points of the second stroke (stroke 2) are treated as independent trajectory point sequences; otherwise (dis (a, c)≤20 or dis (b, c)≤20 pixels), steps where the Euclidean distance is calculated and where the Euclidean distance is judged are repeated until a condition that the Euclidean distances are greater than the preset distance threshold is met. As a result, multiple independent trajectory point sequences can be obtained. According to embodiments of the present disclosure, the accuracy of the generated first feature identifier can be improved.

For example, in specific application scenarios, the first identification sequence can be recognized by using the processor, the first feature identifier corresponding to the first content can be determined, and the cluster relationship of the first content can be determined based on the first feature identifier. In some embodiments, the group relationship and the subordinate relationship can be recognized through following steps: the first content is grouped based on the first feature identifier to obtain the group relationship between first recognition results, and the subordinate relationship corresponding to the first content included in a same group is then determined based on the first feature identifier corresponding to the first content included in the same group.

In some embodiments, the first feature identifier mentioned above can include an image identifier, a digital identifier, a first combination identifier including additional attributes and graphic categories, a second combination identifier including additional attributes and digits, and the like. Additional attributes include color, and/or thin or thick of the stroke. The image identifier can include square, circle, triangle, rectangle, diamond, trapezoid, pentagon, regular hexagon, etc. Additional attributes can also include other graphics, such as ellipse and other irregular graphics, etc., which is not specially limited in embodiments of the present disclosure. Digital identifiers can be, for example, Arabic numerals such as 1, 2, 3, 4, . . . , Roman characters such as I, II, III, IV, . . . , or English numerals one, two, three, four, . . . , etc., which is not specially limited in embodiments of the present disclosure. The first combination identifier can be, for example, a combination of yellow and a square, red and a rectangular, a diamond with thick handwriting, blue and a triangle with thin handwriting, etc. The second combination identifier can be a combination of '1' and green, or a combination of 'I' and orange, green and 'one' with thick or thin handwriting, etc. In practical applications, it can be selected according to actual needs, which is not specially limited in embodiments of the present disclosure. According to the methods provided in embodiments of the present disclosure, the variety of first feature identifiers can be increased, thereby avoiding the low accuracy in the generation of the display region caused by using the same first feature identifier to label different themes.

When the first feature identifier is an image identifier, a specific determination criterion can be shown in Table 1.

TABLE 1

| Graph | Quantity of strokes to be completed | Requirements and Comments |
|---|---|---|
| Circle | 1 stroke | 1. Appropriate spacing can be left at a seal opening; 2. Appropriate circular intersections exist at the seal opening; 3. Shape of the circle should be more circular in a shape, multi-dimensional points are calculated as one trajectory on the entire points, and the algorithm distinguishes to be a regular circle. |
| Triangle | 1, 2, 3 strokes | 1. Equilateral, obtuse, acute, and right angled triangles are to be recognized; 2. The minimum included angle in an obtuse triangle should not be less than 25 degrees; 3. A triangle is returned with an included angle of 30 degrees between a longest edge of the triangle and a horizontal plane as a limit, a regular triangle is returned when the included angle is no more than 30 degrees, and a triangle is returned based on an actual angle of the triangle when the included angle exceeds 30 degrees. |
| Rectangle | 1, 2, 3, 4 strokes | 1. The rectangle is parallel to the horizontal plane, and there can be a maximum of four included angles with smaller writing radians; 2. The four edges should be horizontal and vertical within a certain range. |

TABLE 1-continued

| Graph | Quantity of strokes to be completed | Requirements and Comments |
|---|---|---|
| Trapezoid | 2, 3, 4 strokes | 1. The trapezoid is parallel to the horizontal plane; 2. A ratio of a shortest edge to a longest edge of the trapezoid is between a range [1/3, 4/5]; 3. When a longer bottom edge of the trapezoid is relatively short and it is difficult to distinguish whether it is a triangle according to the above proportion, the trapezoid can be ignored; 4. A right angled trapezoid needs to have two right angles. |
| Diamond | 1, 2, 3, 4 strokes | 1. A regular diamond. |
| Pentagon | 1, 2, 3, 4, 5 strokes | 1. A regular pentagon. |

Specific examples of the above circle, triangle, rectangle, trapezoid, diamond and pentagon can be shown in FIGS. 12-17.

In some embodiments, after obtaining the first feature identifier, the group relationship corresponding to the first content can be determined based on the first feature identifier. In some embodiments, the group relationship corresponding to the first content can be determined through following steps: the first content with the same type of the first feature identifier is extracted from the first content, and is taken as the same group. In some embodiments, the first content with a first identifier of a circular can be used as one group, and the first content with a first identifier of a diamond can be used as another group. Alternatively, the first content with a first combination identifier composed of a triangle and red is used as one group, and the first content with a second combination identifier composed of a rectangle and green is used as another group. Alternatively, in scenarios where a group relationship and a subordinate relationship are determined based on the digital identifier, the first content with the first identifier such as 1, 1.1, 1.2, 1.1.1, etc., can be directly used as one group, and the first content with the first identifier such as 2, 2.1, 2.2, 2.1.1, etc., can be used as another group. In some embodiments, after grouping is completed, the first feature identifier corresponding to the first content needs to be displayed in the display region.

In some embodiments, since the first feature identifier can also include a quantity attribute, the group relationship corresponding to the first content can also be determined through following steps: the subordinate relationship corresponding to the first content included in the group is determined based on the quantities of image identifiers corresponding to the first content included in the same group. In some embodiments, the subordinate relationship corresponding to the first content included in the group can be determined based on a hierarchical logic of digital identifiers corresponding to the first content included in the same group (i.e., the subordinate relationship can be directly determined based on the digital identifiers). In some embodiments, the indentation value in a positional relationship corresponding to the first content included in the same group can also be determined based on the subordinate relationship. The more a position is indented, the lower the level of a first recognition result is.

In some embodiments, in the process of determining the subordinate relationship, a hierarchical relationship (subordinate relationship) corresponding to the first content included in the same group can be determined through the quantity of first feature identifiers corresponding to the first content in a line. In some embodiments, one graph (circle, rectangle, or other) is regarded as a first level in the mind map (first-level theme), two graphs (circle, rectangle, or other) are regarded as a second level in the mind map (two second-level themes of the first-level theme), and so on. Paragraphs without first feature identifiers will not be inserted into the mind map. In some embodiments, the hierarchical relationship and the cluster relationship can be determined through a sequence number. For example, the sequence number ahead of the first-level theme is "1", "2", "3", etc., the sequence number ahead of the second-level theme is "1.1", "1.2", "2.1", etc., and the sequence number ahead of the third-level theme is "1.1.1", "2.2.3", etc. In some embodiments, the subordinate relationship in the same group is determined through the indentation relationship of each line of content. The more the position of a level is indented, the lower the level is. For example, those indented by two words are used as a second-level theme, and those indented by four words are used as a third-level theme, and so on.

It should be noted that in the process of determining the group relationship and the subordinate relationship of other trajectory point sequences presented in the form of notes, the same method through which the group relationship and the subordinate relationship of the current trajectory point sequence inputted by a current user are determined can be used. In some embodiments, groups and levels can be divided based on a sequence number of the note content, that is, groups and levels can be divided based on the sequence number of each content. For example, "1" and "2" are regarded as first-level themes, and "1.1" and "1.3" are sub themes under the corresponding the first-level theme of "1". In some embodiments, groups and levels can be determined based on a shape and a quantity of the graph ahead of each note. For example, a group 1 for those whose shapes are circular, a group 2 for those whose shapes are triangular. In Group 1, the hierarchy is divided based on the quantity of circles, with one circle being regarded as the first-level theme (the one and the only) and two circles being regarded as the second-level theme, and so on. As a result, all the group relationship and the subordinate relationship can be obtained.

In some embodiments, if there is too much continuous input content on the interaction interface, the continuous input content exists in the same line or paragraph, and the content included in the line and/or paragraph needs to correspond to multiple different first identification sequences. In such scenario, the first identification sequence can be configured for the content through following steps: in response to a selection operation from a user for the first content, the first content selected by the user is determined, and the first identification sequence inputted by the user for the first content selected by the user is received through the input component. For example, the input content on the interaction interface is: shareholders, shareholder representatives, and relevant personnel attending this meeting arrive at the venue on time to sign in and confirm their participation qualifications. Shareholders participating in the shareholders' meeting have the right to speak, inquire, vote, and other rights in accordance with the law. If the shareholders' meeting is held through a combination of on-site voting and online voting. A corresponding part can be directly selected through a box, and a corresponding first identification sequence is assigned to the selected part. For example, after the first content in the box is selected, the first identification sequence is input on the interaction interface, and the first feature identifier obtained based on the first identification sequence is assigned to the first content in the box. When inputting the first identification sequence, an input position can overlap with the selected content in position, so as to facilitate the assignment of the first identification sequence to the first content in the overlapped position. When inputting the first identification sequence, the input position may also not overlap with the selected content in position, and the first identification sequence will be assigned to the latest selected first content. In the specific application process, the corresponding first identification sequence can be input according to actual needs, which is not specially limited in embodiments of the present disclosure.

In step S1130, a display region in a preset format is generated based on the cluster relationship, and the display region is displayed on an interaction interface, the display region including the cluster relationship and a standardized text corresponding to the first content.

In some embodiments, based on the group relationship and subordinate relationship obtained above, a first recognition result can be sequentially arranged according to a preset arrangement rule, to obtain a display region in the first preset format. The display region is a mind map. In some embodiments, after obtaining the display region in the first preset format, if it is necessary to display the display region through the interaction interface, it can also respond to the first touch command on the interaction interface of the display system exerted by the current user, to convert the display region in the first preset format to the display region in the second preset format, so that the current user can view the display region in the second preset format.

In some embodiments, the method for processing the trajectory point sequence mentioned above can also include determining at least one node and determine a subordinate identifier corresponding to the node. When it is determined that the first feature identifier corresponding to the first content and the subordinate identifier corresponding to the node are consistent, the first content is regarded as a child node of that node. In some embodiments, in specific application scenarios, one node can be determined first, and the node is regarded as a "mind map body". The subordinate identifier corresponding to the node can then be determined, for example, a circle or a rectangle. Next, for each first feature identifier, whether the first feature identifier is consistent with the subordinate identifier is determined. If the first feature identifier is consistent with the subordinate identifier, the first content is regarded as a child node of the node and added to a corresponding position. After all of the first content has been added, the node and its subordinate identifiers can be displayed in the display region.

In some embodiments, the method for processing the trajectory point sequence can further include recognizing the first content in response to the first identification sequence inputted by the user for the first content, to obtain the recognition result of the first content, and generating a display region containing the recognition result of the first content and the group relationship of the first content based on the group relationship. In some embodiments, the generation process of the display region can also be achieved through following steps: upon receiving the first identification sequence inputted by the user for the first content, recognizing the first content to obtain the recognition result of the first content, and then generating a display region containing the recognition result of the first content and the group relationship of the first content based on the group relationship.

In some embodiments, if it is necessary to edit the mind map with a standard layout again, the display region in the second preset format can be converted to the display region in the first preset format, in response to a second touch command on the interaction interface exerted by the user. The display region in the first preset format can then be edited again, and the generating of the display region mentioned above will be repeated, so as to obtain a more accurate mind map. As a result, the accuracy of the generated mind map can be further improved, thereby enhancing the user experience of using the conference integrated machine.

In some embodiments, during the process of editing the display region in the first preset format again, it can be achieved through following steps: an insertion symbol is generated in response to a third touch command at a first preset position in the first content exerted by the user. In some embodiments, the preset position includes any position in the trajectory point sequence. The newly added trajectory point sequence to be recognized, which is inputted by the user, is inserted based on the position where the insertion symbol is located. In some embodiments, the insertion symbol can be a vertical line, or the insertion symbol can be a space occupying 1 character. The insertion symbol can be placed at any position, for example, in front of the first character, between any two characters, or at the end of the last character, etc., which is not specially limited in embodiments of the present disclosure.

In some embodiments, during the process of editing the display region in the first preset format again, it can be achieved through following steps: a deletion symbol is generated in response to a fourth touch command at a second preset position in the first content exerted by the user. In some embodiments, the second preset position includes a position where any character and/or image in the trajectory point sequence is located. Based on the position where the deletion symbol is located, the characters and/or images corresponding to the position is deleted. In some embodiments, the deletion symbol can be a folded line with folded times greater than or equal to 3 in a horizontal (also can be vertical or inclined) direction on a certain character, or other symbols, which is not specially limited in embodiments of the present disclosure.

It should be noted that by setting the insertion symbol and the deletion symbol, users can insert and delete characters according to their actual needs, thereby improving the accuracy of the input trajectory point sequence to be recognized and the cleanliness of a page, thereby improving the user experience.

Figure 18:
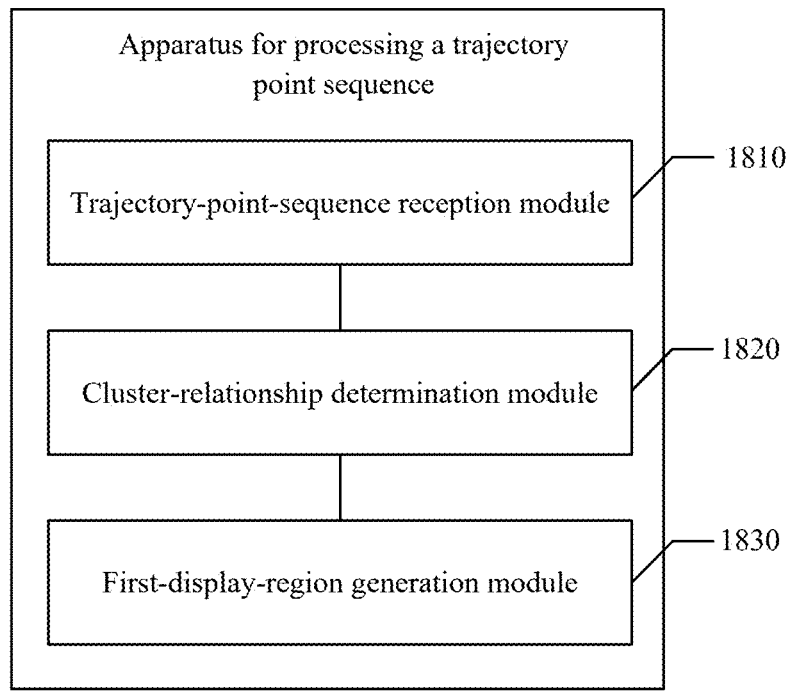
FIG. 18 schematically illustrates a block diagram of an apparatus for processing a trajectory point sequence according to embodiments of the present disclosure.

Embodiments of the present disclosure also provide an apparatus for processing a trajectory point sequence, which is configured in a display system. As shown in FIG. 18, the apparatus for processing the trajectory point sequence can include a trajectory-point-sequence reception module 1810, a cluster-relationship determination module 1820, and a first-display-region generation module 1830.

The trajectory-point-sequence reception module 1810 can be configured to receive a trajectory point sequence inputted by a user, generate a first content in response to an input from the user, and display the first content, the trajectory point sequence including a first identification sequence.

The cluster-relationship determination module 1820 can be configured to recognize the first identification sequence inputted by the user for the first content, determine a first feature identifier corresponding to the first content, and determine a cluster relationship of the first content based on the first feature identifier.

The first-display-region generation module 1830 can be configured to generate a display region in a preset format based on the cluster relationship, and display the display region on the interaction interface, the display region including the cluster relationship and a standardized text corresponding to the first content.

In some embodiments of the present disclosure, the trajectory point sequence includes a first content sequence.

In some embodiments, generating the first content includes receiving the first content sequence sent by the user, generating first content based on the first content sequence, and controlling the display to display the first content.

In some embodiments of the present disclosure, the first content includes the standardized text and/or a non-standardized text.

In some embodiments of the present disclosure, when the first content includes the non-standardized text, the apparatus for processing the trajectory point sequence further includes a first-content recognition module configured to recognize the first content in response to the first identification sequence inputted by the user for the first content, and obtain the standardized text corresponding to the first content.

In some embodiments of the present disclosure, the cluster relationship includes a group relationship and/or a subordinate relationship.

In some embodiments, the cluster-relationship determination module can further be configured to group the first content based on the first feature identifier to obtain the group relationship corresponding to the first content; and/or determine the subordinate relationship corresponding to the first content included in a same group based on the first feature identifier corresponding to the first content included in the same group.

In some embodiments of the present disclosure, the first feature identifier includes any type of an image identifier, a digital identifier, a first combination identifier containing an additional attribute and a graphic category, and a second combination identifier containing an additional attribute and a digit.

In some embodiments of the present disclosure, the additional attribute includes a color attribute and/or a thickness attribute of a stroke.

In some embodiments of the present disclosure, the cluster-relationship determination module can further be configured to determine the group relationship and the subordinate relationship based on a digital identifier.

In some embodiments of the present disclosure, the cluster-relationship determination module can further be configured to extract from the first content, a first content with the same type of the first feature identifier, and take the first content with the same type of the first feature identifier as a same group.

In some embodiments of the present disclosure, the first feature identifier further includes a quantity attribute.

In some embodiments, the cluster-relationship determination module can further be configured to determine the subordinate relationship corresponding to the first content included in a same group based on quantities of image identifiers corresponding to the first content included in the same group.

In some embodiments of the present disclosure, the apparatus for processing the trajectory point sequence further includes a first-feature-identifier display module.

The first-feature-identifier display module can be configured to display the first feature identifier corresponding to the first content in the display region.

In some embodiments of the present disclosure, the apparatus for processing the trajectory point sequence further includes a subordinate-identifier determination module and a child-node determination module.

The subordinate-identifier determination module can be configured to determine at least one node and determine a subordinate identifier corresponding to that node.

The child-node determination module can be configured to take, in response to determination that the first feature identifier of the first content is consistent with the subordinate identifier corresponding to the node, the first content as a child node of the node.

In some embodiments of the present disclosure, the apparatus for processing the trajectory point sequence further includes a node and subordinate identifier display module.

The node and subordinate identifier display module can be configured to display the node and the subordinate identifier in the display region.

In some embodiments of the present disclosure, recognizing the first identification sequence inputted by the user for the first content, and determining the first feature identifier corresponding to the first content includes: determining, in response to a selection operation from the user for the first content, the first content selected by the user; and receiving, through an input component, the first identification sequence inputted by the user for the first content selected by the user.

In some embodiments of the present disclosure, the first-display-region generation module can further be configured to arrange, based on the cluster relationship, the first content sequentially according to a preset arrangement rule, to obtain a display region in a first preset format.

In some embodiments of the present disclosure, the first-display-region generation module can further be configured to convert the display region in the first preset format to the display region in a second preset format, so that the user can view the display region in the second preset format.

In some embodiments of the present disclosure, the first-display-region generation module can further be configured to convert the display region in the second preset format to the display region in the first preset format, and edit the display region in the first preset format again.

In some embodiments of the present disclosure, the display region is a mind map, the display system includes an intelligent interactive tablet, and the input component is a touch component.

Specific details of each module in the apparatus for processing the trajectory point sequence mentioned above have been described in detail in the corresponding methods for processing the trajectory point sequence, which will not be repeated herein.

It should be noted that although several modules or units of the apparatus provided for action execution are mentioned in above descriptions in detail, such division of modules is not mandatory. In fact, according to embodiments disclosed in the present disclosure, the features and functions of two or more modules or units described above can be embodied in one module or unit. On the contrary, the features and functions of one module or unit described above can be further divided into multiple modules or units for implementation.

In some embodiments, although various steps of methods in the present disclosure are described in a specific order in the drawings, this does not require or imply that these steps must be executed in that specific order, or that all steps shown must be executed in order to achieve the desired results. Additionally or alternatively, steps can be omitted, multiple steps can be merged into one step for execution, and/or one step can be decomposed into multiple steps for execution.

Embodiments of the present disclosure also provide an electronic device capable of implementing the above methods.

Those skilled in the art can understand that various aspects of the present disclosure can be implemented as systems, methods, or program products. Therefore, various aspects of the present disclosure can be specifically implemented in the following forms: the complete hardware implementation, the complete software implementation (including firmware, microcode, etc.), or a combination of hardware and software implementations, which can be collectively referred to as "circuit", "module", or "system".

The electronic device 1900 according to this embodiment of the present disclosure will be described below with reference to FIG. 19. The electronic device 1900 shown in FIG. 19 is only an example and should not impose any limitations on the functionality or scope of use of the disclosed embodiment.

An electronic device 1900 according to embodiments of the present disclosure will be described below with reference to FIG. 19. The electronic device 1900 shown in FIG. 19 is only an example and should not impose any limitations on the functionality and scope of use of the embodiments of the present disclosure.

Figure 19:
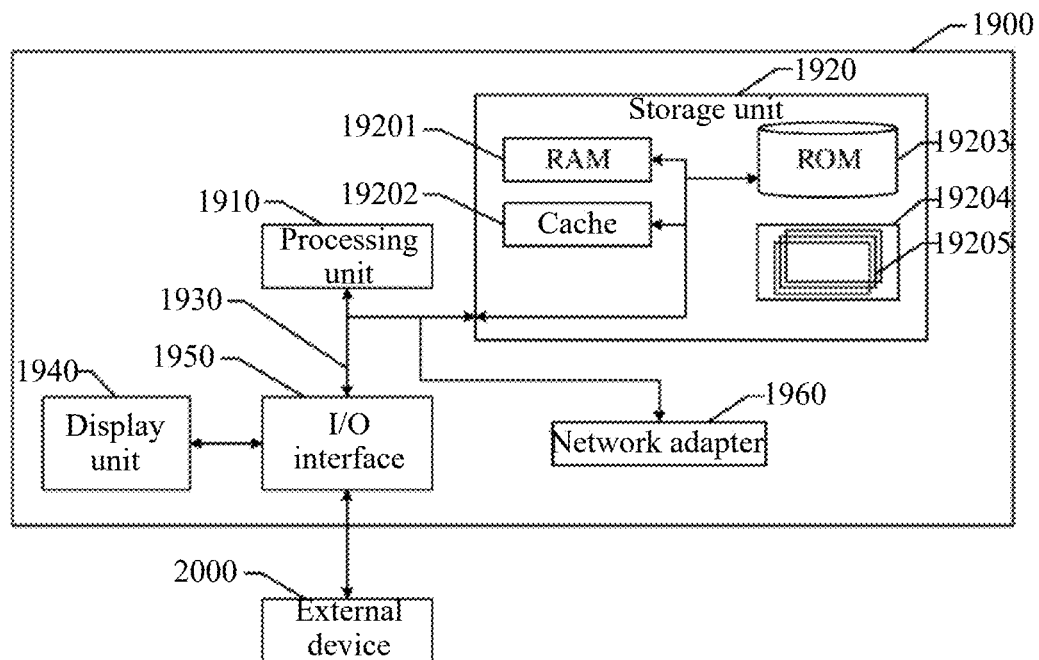
FIG. 19 schematically illustrates an electronic device for implementing a method for processing a trajectory point sequence according to embodiments of the present disclosure.

As shown in FIG. 19, the electronic device 1900 is represented in the form of a universal computing device. The components of electronic device 1900 can include but are not limited to at least one processing unit 1910, at least one storage unit 1920, a bus 1930 connecting different system components (including storage unit 1920 and processing unit 1910), and a display unit 1940.

In some embodiments, the storage unit 1920 stores program codes, which can be executed by the processing unit 1910, causing the processing unit 1910 to execute steps described in "exemplary methods" according to various embodiments of the present disclosure. For example, the processing unit 1910 can perform steps as shown in FIG. 11, including step S1110, a trajectory point sequence inputted by a user is received, a first content is generated in response to an input from the user and is displayed, the trajectory point sequence including a first identification sequence; step S1120, the first identification sequence inputted by the user for the first content is recognized, a first feature identifier corresponding to the first content is determined, and a cluster relationship of the first content is determined based on the first feature identifier; and step S1130, a display region in a preset format is generated based on the cluster relationship, and the display region is displayed on an interaction interface, the display region including the cluster relationship and a standardized text corresponding to the first content.

The storage unit 1920 may include a readable medium in the form of a volatile storage unit, such as a random access storage unit (RAM) 19201 and/or a cache storage unit 19202, and may further include a read-only storage unit (ROM) 19203.

The storage unit 1920 may further include a program/utility tool 19204 with a (at least one) set of program modules 19205, such as but not limited to an operating system, one or more application programs, other program modules, and program data, each or some combination of which may include an implementation of a network environment.

The bus 1930 can represent one or more types of bus structures, including storage unit buses or storage unit controllers, peripheral buses, graphics acceleration ports, processing units, or local area buses using any of various bus structures.

The electronic device 1900 can also communicate with one or more external devices 2000 (such as a keyboard, a pointing device, a Bluetooth device, etc.), and can also communicate with one or more devices that enable users to interact with electronic device 1900, and/or with any device that enables electronic device 1900 to communicate with one or more other computing devices (such as a router, a modem, etc.). The communication can be carried out through an input/output (I/O) interface 1950. Moreover, electronic device 1900 can also communicate with one or more networks (such as a local area network (LAN), a wide area network (WAN), and/or a public network, such as the Internet) through a network adapter 1960. As shown in the figure, the network adapter 1960 communicates with other modules of electronic device 1900 through the bus 1930. It should be understood that although not shown in the figure, other hardware and/or software modules can be used in conjunction with electronic device 1900, including but not limited to microcodes, device drivers, redundant processing units, external disk drive arrays, RAID systems, tape drives, and data backup storage systems.

According to descriptions of above method embodiments, it is easy for those skilled in the art to understand that the exemplary method embodiments described herein can be implemented through software or through combination of software and necessary hardware. Therefore, the technical solutions according to embodiments of the present disclosure can be embodied in the form of a software product, which can be stored on a non-volatile storage medium (such as CD-ROM, USB drive, mobile hard drive, etc.) or on a network, including several instructions to enable a computing device (such as a personal computer, a server, a terminal device, or a network device, etc.) to execute the methods according to embodiments of the present disclosure.

In embodiments of the present disclosure, a computer-readable storage medium is also provided, on which a program product capable of implementing the methods described in the present disclosure is stored. In some embodiments, various aspects of the present disclosure can also be implemented in the form of a program product, which includes program codes used to cause the terminal device to perform steps described in "exemplary methods" according to various embodiments of the present disclosure when the program product is running on the terminal device.

A program product for implementing above method according to the embodiments of the present disclosure is shown. The program product can be a portable compact disk read only memory (CD-ROM) including program codes, and can be run on a terminal device, such as running on a personal computer. However, the program product of the present disclosure is not limited thereto. In the present disclosure, a readable storage medium may be any tangible medium that contains or stores a program, and the program can be used by or in conjunction with an instruction execution system, apparatus, or device.

The program product may be any combination of one or more readable media. The readable medium may be a readable signal medium or a readable storage medium. The readable storage medium may be, for example, but not limited to, an electrical, magnetic, optical, electromagnetic, infrared, or semiconductor system, apparatus or device, or a combination of any of the above. More specific examples (non-exhaustive list) of readable storage media include, electrical connections with one or more wires, portable disks, hard disks, random access memory (RAM), read only memory (ROM), erasable programmable read only memory (EPROM or flash), optical fiber, portable compact disk read only memory (CD-ROM), optical storage devices, magnetic storage devices, or any suitable combination of the above.

A computer readable signal medium may include a propagated data signal in a baseband or as part of a carrier wave with readable program codes embodied thereon. Such propagated data signals may take a variety of forms, including but not limited to electromagnetic signals, optical signals, or any suitable combination of the above. A readable signal medium may also be any readable medium other than a readable storage medium that can transmit, propagate, or transport the program used by or in connection with the instruction execution system, apparatus, or device.

Program codes embodied on a readable medium may be transmitted using any suitable medium, including but not limited to wireless, wireline, optical fiber cable, RF, etc., or any suitable combination of the above.

Program codes for carrying out operations of the present disclosure may be written in any combination of one or more programming languages, including object-oriented programming languages, such as Java, C++, etc., as well as conventional procedural programming languages, such as "C" language or similar programming languages. The program codes may be executed entirely on a user's computing device, partly on the user's device, as a stand-alone software package, partly on the user's computing device and partly on a remote computing device, or entirely on the remote computing device or a server. Where the remote computing device is involved, the remote computing device may be connected to the user's computing device over any kind of network, including a local area network (LAN) or a wide area network (WAN), or may be connected to an external computing device (e.g., connected via the Internet with the help of an Internet Service Provider).

In addition, the above drawings are only a schematic explanation of processes included in the methods according to embodiments disclosed in the present disclosure, and are not for the purpose of limitation. It is easy to understand that the processes shown in above figures do not indicate or limit an order of these processes. In addition, it is also easy to understand that these processes can be executed, for example, through multiple modules synchronously or asynchronously.

After considering and practicing the content disclosed in the present disclosure, those skilled in the art will easily come up with other embodiments of the present disclosure. The present disclosure is intended to cover any variations, uses, or adaptations of the present disclosure, which follow the general principles of the present disclosure and include common knowledge or commonly used technical means in the art that are not disclosed in the present disclosure. The specification and embodiments are only considered exemplary, and a true scope and spirit of the present disclosure are indicated by claims.

What is claimed is:

1. A display system, comprising a display, a processor, and an input component, wherein
   the processor is configured to control the display to display an interaction interface;

the processor is further configured to receive a trajectory point sequence inputted by a user through the input component;

the processor is further configured to generate a first content based on the trajectory point sequence and control the display to display the first content, wherein the trajectory point sequence comprises a first identification sequence, and the processor is further configured to recognize the first identification sequence to determine a first feature identifier corresponding to the first content, and determine a cluster relationship of the first content based on the first feature identifier; and the processor is further configured to generate a display region in a preset format based on the cluster relationship, and control the display to display the display region on the interaction interface, wherein the display region comprises the cluster relationship and a standardized text corresponding to the first content, wherein the cluster relationship comprises a group relationship, and the processor is further configured to: group the first content based on the first feature identifier, to obtain the group relationship corresponding to the first content.

2. The display system according to claim 1, wherein the trajectory point sequence comprises a first content sequence, and the processor is further configured to:

receive the first content sequence inputted by the user, generate the first content based on the first content sequence, and control the display to display the first content.

3. The display system according to claim 1, wherein the first content comprises at least one of the standardized text or a non-standardized text.

4. The display system according to claim 3, wherein the processor is further configured to:

recognize, in response to the first identification sequence inputted by the user for the first content, the first content to obtain the standardized text corresponding to the first content.

5. The display system according to claim 1, wherein the cluster relationship further comprises a subordinate relationship, and the processor is further configured to:

determine the subordinate relationship corresponding to the first content comprised in a same group based on the first feature identifier corresponding to the first content comprised in the same group.

6. The display system according to claim 5, wherein the first feature identifier comprises any type of an image identifier, a digital identifier, a first combination identifier containing an additional attribute and a graphic category, and a second combination identifier containing an additional attribute and a digit.

7. The display system according to claim 6, wherein the processor is further configured to:

determine the group relationship and the subordinate relationship based on the digital identifier.

8. The display system according to claim 7, wherein the first feature identifier further comprises a quantity attribute, and the processor is further configured to:

determine the subordinate relationship corresponding to the first content comprised in a same group based on quantities of image identifiers corresponding to the first content comprised in the same group.

9. The display system according to claim 8, wherein the processor is further configured to:

display the first feature identifier corresponding to the first content in the display region.

10. The display system according to claim 6, wherein the processor is further configured to:

determine a first content with a same type of the first feature identifier, and take the first content with the same type of the first feature identifier as a same group.

11. The display system according to claim 6, wherein the processor is further configured to:

determine at least one node and determine a subordinate identifier corresponding to the node; and take, in response to determination that the first feature identifier corresponding to the first content is consistent with the subordinate identifier corresponding to the node, the first content as a child node of the node.

12. The display system according to claim 11, wherein the processor is further configured to:

display the node and the subordinate identifier in the display region.

13. The display system according to claim 1, wherein the trajectory point sequence comprises a second content sequence, and the processor is further configured to:

determine, in response to a selection operation from the user on the second content sequence, the first content selected by the user; and receive, through the input component, the first identification sequence inputted by the user for the first content selected by the user.

14. The display system according to claim 13, wherein the processor is further configured to:

assign the first identification sequence inputted by the user to the first content selected by the user based on a position where or a time when the first identification sequence is inputted.

15. The display system according to claim 1, wherein the processor is further configured to:

arrange, based on the cluster relationship, the first content sequentially according to a preset arrangement rule, to obtain a display region in a first preset format.

16. The display system according to claim 15, wherein the processor is further configured to:

convert, in response to a first touch command on the interaction interface by the user, the display region in the first preset format to the display region in a second preset format, so that the user can view the display region in the second preset format.

17. The display system according to claim 16, wherein the processor is further configured to:

convert, in response to a second touch command on the interaction interface by the user, the display region in the second preset format to the display region in the first preset format; and edit the display region in the first preset format.

18. The display system according to claim 1, wherein the display region comprises a mind map, the display system comprises an intelligent interactive tablet, and the input component comprises a touch component.

19. A method for processing a trajectory point sequence, configured in a display system, wherein the display system displays an interaction interface on a display thereof, and the method for processing the trajectory point sequence comprises:

receiving a trajectory point sequence inputted by a user, generating a first content based on the trajectory point sequence, and displaying the first content, wherein the trajectory point sequence comprises a first identification sequence;

recognizing the first identification sequence to determine a first feature identifier corresponding to the first content, and determining a cluster relationship of the first content based on the first feature identifier; and generating a display region in a preset format based on the cluster relationship, and displaying the display region on the interaction interface, wherein the display region comprises the cluster relationship and a standardized text corresponding to the first content;

wherein the cluster relationship comprises a group relationship, and determining the cluster relationship of the first content based on the first feature identifier comprises:

grouping the first content based on the first feature identifier, to obtain the group relationship corresponding to the first content.

20. A non-transitory computer-readable storage medium having a computer program stored thereon, which when executed by a processor, cause the method for processing the trajectory point sequence according to claim 19 to be implemented.

\* \* \* \* \*